(12) United States Patent
Inoue et al.

(10) Patent No.: US 12,357,881 B2
(45) Date of Patent: Jul. 15, 2025

(54) GOLF BALL

(71) Applicant: Sumitomo Rubber Industries, Ltd., Kobe (JP)

(72) Inventors: Hidetaka Inoue, Kobe (JP); Mariko Hashinokuchi, Kobe (JP); Kazuya Kamino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 117 days.

(21) Appl. No.: 18/195,994

(22) Filed: May 11, 2023

(65) Prior Publication Data

US 2023/0381595 A1    Nov. 30, 2023

(30) Foreign Application Priority Data

May 27, 2022 (JP) .................. 2022-086868
May 27, 2022 (JP) .................. 2022-086869
May 27, 2022 (JP) .................. 2022-086870

(51) Int. Cl.
| | |
|---|---|
| A63B 37/06 | (2006.01) |
| A63B 37/00 | (2006.01) |
| C08K 5/05 | (2006.01) |

(52) U.S. Cl.
CPC ...... *A63B 37/0063* (2013.01); *A63B 37/0031* (2013.01); *A63B 37/0033* (2013.01); *A63B 37/0043* (2013.01); *A63B 37/0045* (2013.01); *A63B 37/0087* (2013.01); *C08K 5/05* (2013.01)

(58) Field of Classification Search
CPC ............ A63B 37/0063; A63B 37/0031; A63B 37/0043
See application file for complete search history.

(56) References Cited

U.S. PATENT DOCUMENTS

| | | | | |
|---|---|---|---|---|
| 2011/0028246 | A1* | 2/2011 | Kimura | C08K 5/098 473/383 |
| 2013/0123044 | A1* | 5/2013 | Mikura | C08L 33/08 473/373 |
| 2013/0303307 | A1* | 11/2013 | Sakamine | C08K 5/098 473/372 |
| 2013/0324321 | A1* | 12/2013 | Sajima | A63B 37/0063 473/373 |

(Continued)

FOREIGN PATENT DOCUMENTS

| | | |
|---|---|---|
| JP | 2016-112308 A | 6/2016 |
| JP | 2021-62036 A | 4/2021 |

*Primary Examiner* — Raeann Gorden
(74) *Attorney, Agent, or Firm* — Birch, Stewart, Kolasch & Birch, LLP

(57) ABSTRACT

An object of the present disclosure is to provide a golf ball having excellent flight distance on driver shots and good spin rate on middle iron shots. The present disclosure provides a golf ball comprising a spherical core and a cover, wherein a hardness difference (C1−C0), a hardness difference (C2−C1), a hardness difference (C3−C2) and a hardness difference (C4−C3) are more than 0 and 6.0 or less, a hardness difference (C5−C4) is 5.0 or more, and a hardness difference (C6−C5), a hardness difference (C7−C6) and a hardness difference (C8−C7) are more than 0 and 3.5 or less where C0 (center), C1, C2, C3, C4, C5, C6, C7 and C8 (surface) are a Shore C hardness at each point from the center obtained by dividing a radius of the spherical core into equal eight parts.

20 Claims, 6 Drawing Sheets

(56) References Cited

U.S. PATENT DOCUMENTS

2016/0175660 A1  6/2016  Watanabe et al.
2016/0236040 A1* 8/2016  Comeau ............ A63B 37/0043
2021/0106879 A1  4/2021  Watanabe et al.

* cited by examiner

GOLF BALL

FIELD OF THE INVENTION

The present disclosure relates to a golf ball, and particularly relates to a hardness distribution of a spherical core.

DESCRIPTION OF THE RELATED ART

A golf ball is required to have excellent flight performance on driver shots. As a method for improving a flight distance on driver shots, appropriately selecting a hardness profile of a spherical core is exemplified. Specifically, it is known that greater hardness difference between a surface hardness and a center hardness of a spherical core lowers a spin rate on driver shots and improves a flight distance on driver shots.

For example, JP 2021-062036 A discloses a golf ball comprising a core, an intermediate layer and a cover, wherein the core is formed primarily of a base rubber and has a diameter in a specific range, the intermediate layer and the cover are each formed of a resin material, with regard to interior hardness of the core, i.e. a hardness at a core center, hardness at positions located every 2 mm from the core center to 16 mm, and a hardness at a core surface, hardness differences of these hardness are at or below a predetermined value, and a surface hardness of the ball is lower than a surface hardness of an intermediate layer-encased sphere.

In addition, JP 2016-112308 A discloses a multi-piece solid golf ball comprising a core, a cover and an intermediate layer therebetween, wherein a surface hardness of the core, a surface hardness of an intermediate layer-encased sphere and a surface hardness of the ball satisfy a predetermined relationship, a thickness of the intermediate layer and a thickness of the cover satisfy a predetermined relationship, and the surface hardness (Cs) of core, a core center C hardness (Cc), a hardness (C5) at a position 5 mm from the core center, and a hardness (Cm) at a position midway between the core surface and the core center in the core hardness distribution satisfy a predetermined relationship.

SUMMARY OF THE INVENTION

A professional golfer or a highly skilled golfer requests an increased spin rate on middle iron shots as well as an improved flight distance on driver shots. However, when the hardness difference between the surface hardness and the center hardness of the spherical core is controlled to lower the spin rate on driver shots, the spin rate on middle iron shots also tends to be lowered.

The present disclosure has been made in view of the abovementioned circumstances, and an object of the present disclosure is to provide a golf ball having excellent flight distance on driver shots and good spin rate on middle iron shots.

The present disclosure that has solved the above problem provides a golf ball comprising a spherical core and a cover covering the spherical core, wherein when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at % point from the center, a hardness (C5) at 62.5% point from the center, a hardness (C6) at 75.0% point from the center, a hardness (C7) at 87.5% point from the center and a surface hardness (C8) of the spherical core in Shore C hardness satisfy the formulae (1) to (8).

$$0 < (C1-C0) \leq 6.0 \tag{1}$$

$$0 < (C2-C1) \leq 6.0 \tag{2}$$

$$0 < (C3-C2) \leq 6.0 \tag{3}$$

$$0 < (C4-C3) \leq 6.0 \tag{4}$$

$$5 \leq (C5-C4) \tag{5}$$

$$0 < (C6-C5) \leq 3.5 \tag{6}$$

$$0 < (C7-C6) \leq 3.5 \tag{7}$$

$$0 < (C8-C7) \leq 3.5 \tag{8}$$

According to the present disclosure, a golf ball having excellent flight distance on driver shots and good spin rate on middle iron shots is obtained.

DESCRIPTION OF THE PREFERRED EMBODIMENT

Figure 1:
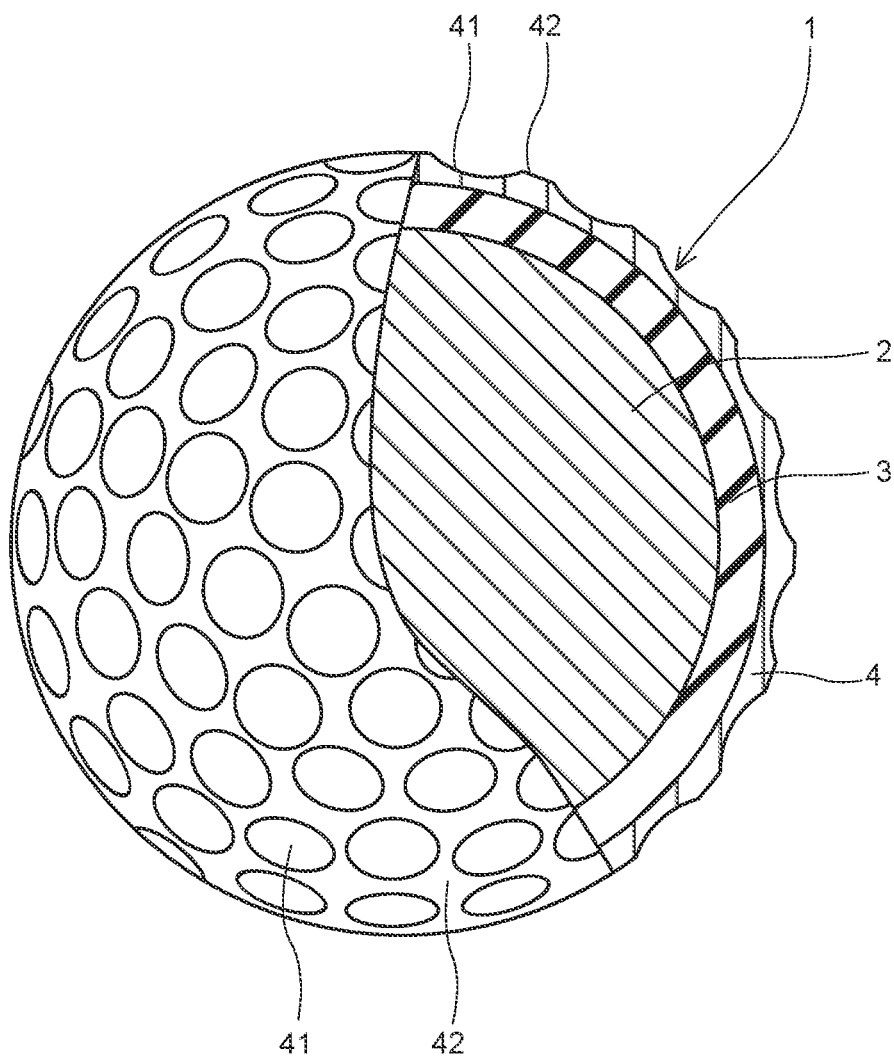
FIG. 1 is a partially cutaway cross-sectional view showing a golf ball according to one embodiment of the present disclosure.
Figure 2:
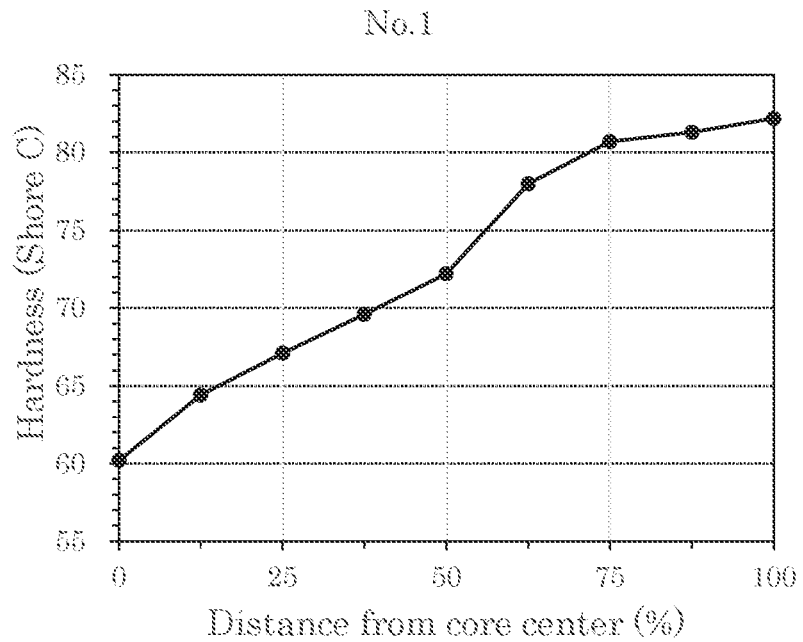
FIG. 2 is a graph showing the hardness distribution of the spherical core.
Figure 3:
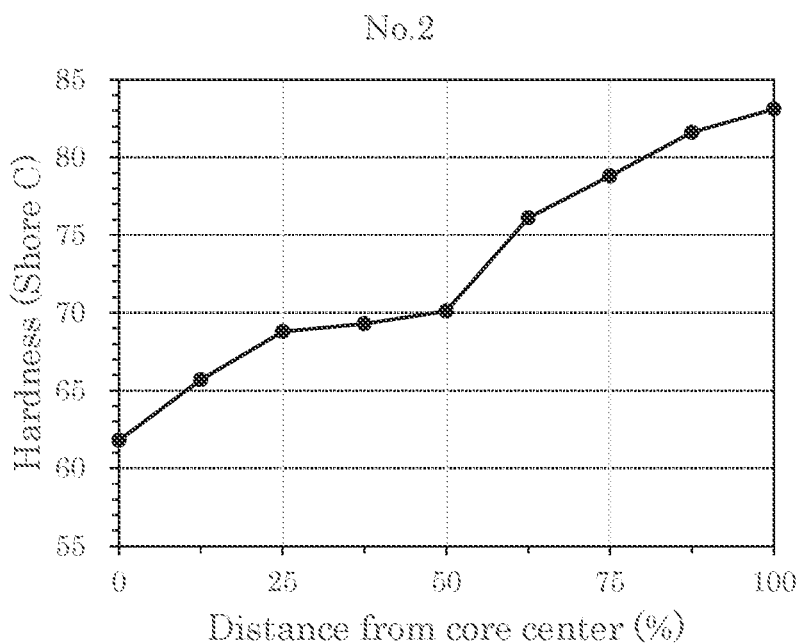
FIG. 3 is a graph showing the hardness distribution of the spherical core.
Figure 4:
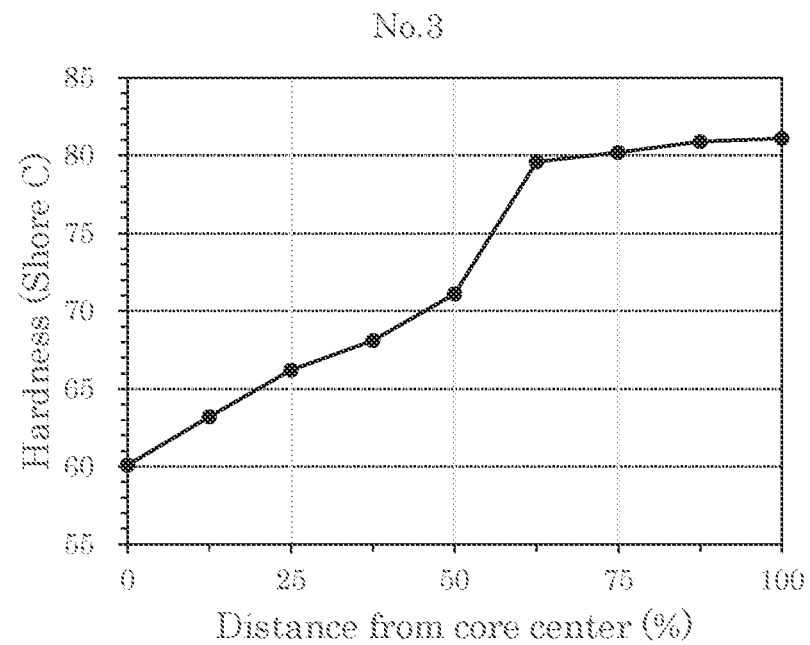
FIG. 4 is a graph showing the hardness distribution of the spherical core.
Figure 5:
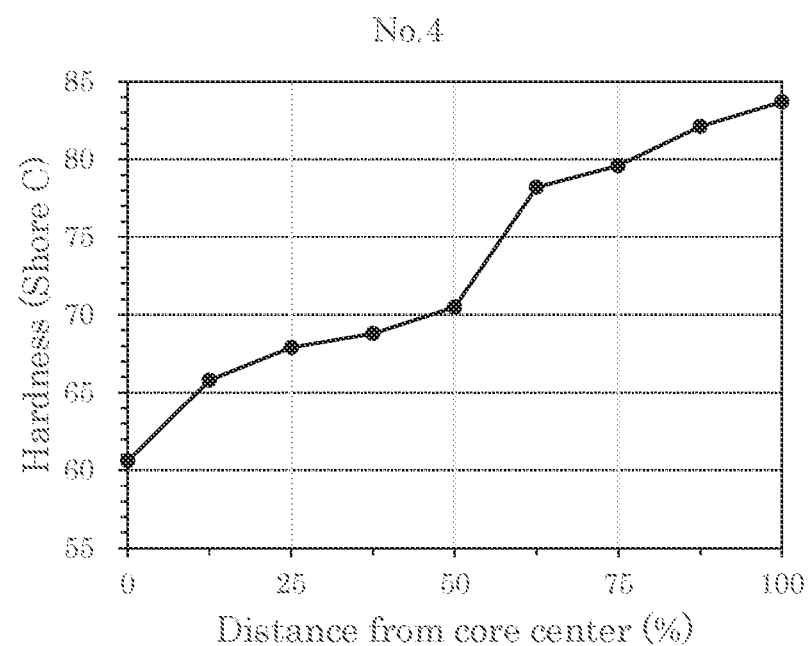
FIG. 5 is a graph showing the hardness distribution of the spherical core.
Figure 6:
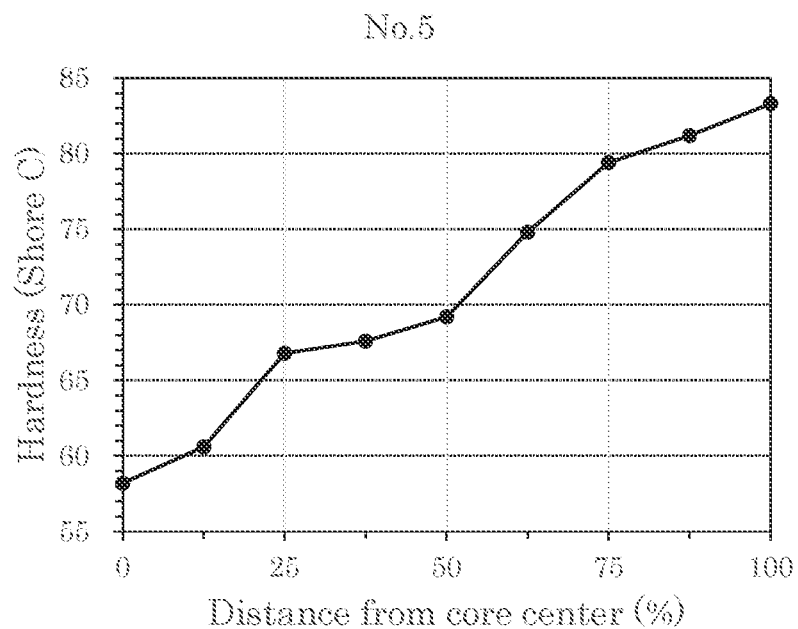
FIG. 6 is a graph showing the hardness distribution of the spherical core.
Figure 7:
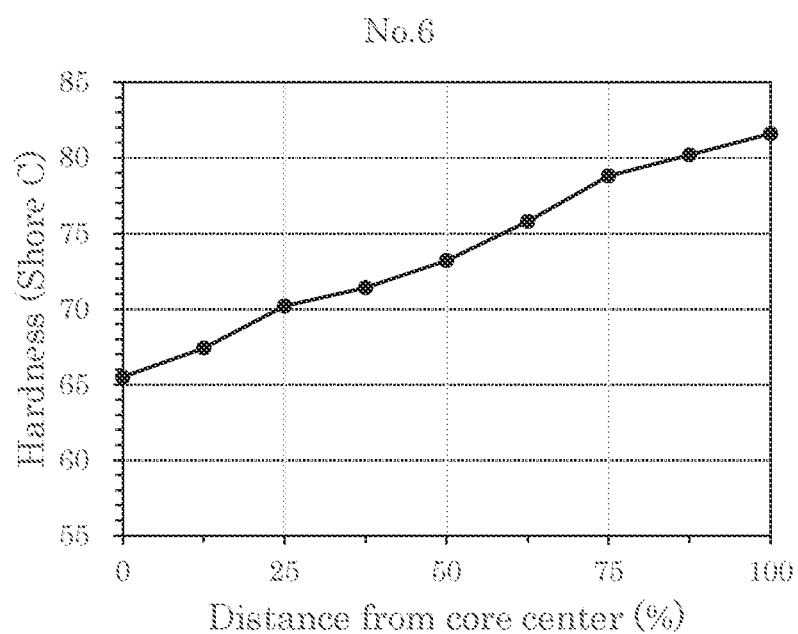
FIG. 7 is a graph showing the hardness distribution of the spherical core.
Figure 8:
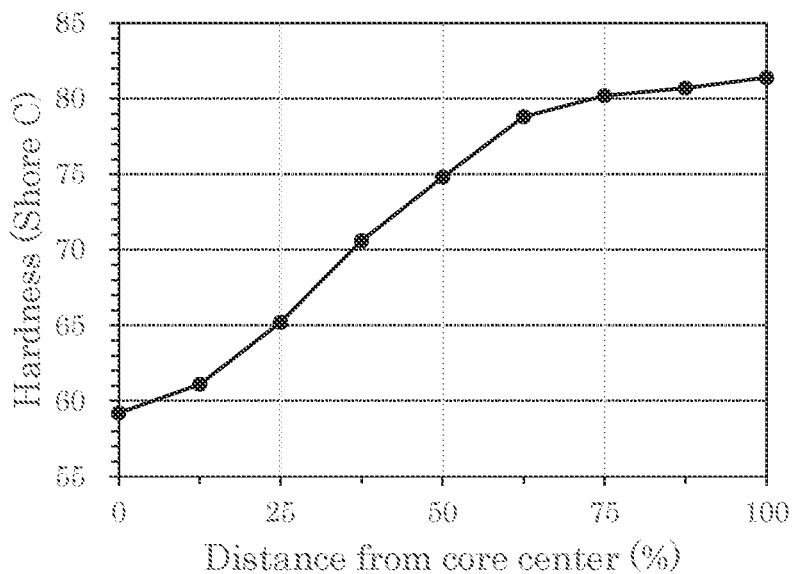
FIG. 8 is a graph showing the hardness distribution of the spherical core.
Figure 9:
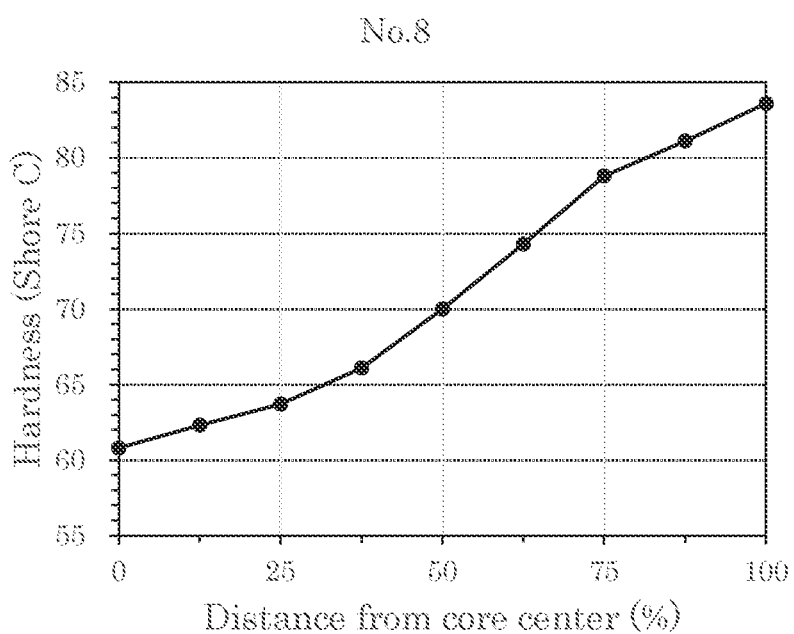
FIG. 9 is a graph showing the hardness distribution of the spherical core.
Figure 10:
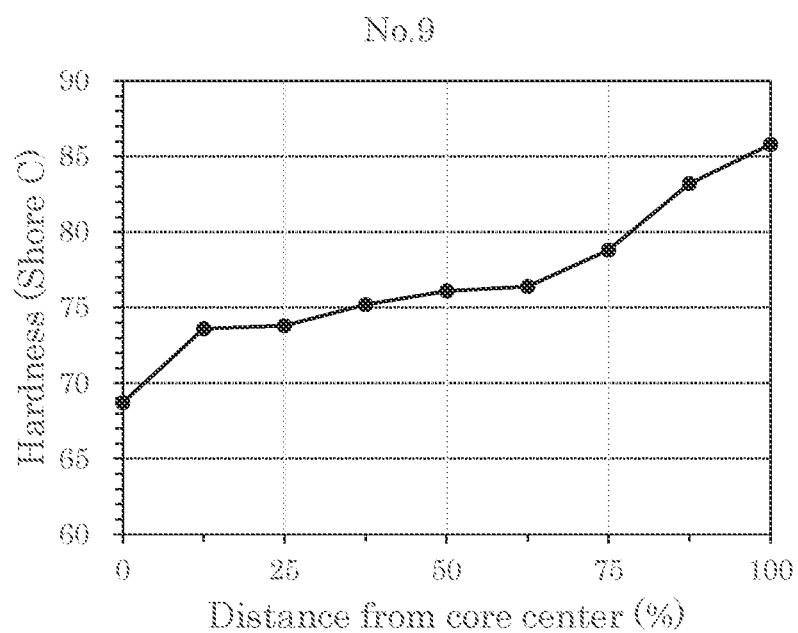
FIG. 10 is a graph showing the hardness distribution of the spherical core.

The present disclosure provides a golf ball comprising a spherical core and a cover covering the spherical core, wherein when a line starting from a center of the spherical core and ending at a surface of the spherical core is divided into equal eight parts, a center hardness (C0) (a hardness at 0% point from the center), a hardness (C1) at 12.5% point from the center, a hardness (C2) at 25.0% point from the center, a hardness (C3) at 37.5% point from the center, a hardness (C4) at % point from the center, a hardness (C5) at 62.5% point from the center, a hardness (C6) at 75.0% point from the center, a hardness (C7) at 87.5% point from the center and a surface hardness (C8) (a hardness at 100% point from the center) of the spherical core in Shore C hardness satisfy the formulae (1) to (8).

$$0 < (C1-C0) \leq 6.0 \tag{1}$$

$$0 < (C2-C1) \leq 6.0 \tag{2}$$

$$0 < (C3-C2) \leq 6.0 \tag{3}$$

$$0<(C4-C3)\leq 6.0 \tag{4}$$

$$5\leq (C5-C4) \tag{5}$$

$$0<(C6-C5)\leq 3.5 \tag{6}$$

$$0<(C7-C6)\leq 3.5 \tag{7}$$

$$0<(C8-C7)\leq 3.5 \tag{8}$$

The formulae (1) to (4) specify the hardness distribution in the vicinity of the center of the spherical core. If a portion having an excessively large hardness gradient exists in the vicinity of the center, the deformation amount at that portion is large on driver shots. This large deformation breaks the deformation balance of the golf ball as a whole and lowers the resilience performance, thus the flight distance is decreased. Thus, if the formulae (1) to (4) are satisfied, the resilience performance is good and the flight distance on driver shots improves. In addition, if the hardness gradient is provided in the vicinity of the center of the spherical core, the recoil amount on driver shots is increased. Thus, the spin rate on driver shots is lowered, and the flight distance further improves.

An imaginary straight line is provided from the center of the spherical core to the surface of the spherical core, and the length of the imaginary straight line is divided into equal eight parts to provide seven points between the center of the spherical core and the surface of the core. The first point is located at 12.5% of the length of the straight line from the center, the second point is located at 25.0% of the length of the straight line from the center, the third point is located at 37.5% of the length of the straight line from the center, the fourth point is located at 50.0% of the length of the straight line from the center, the fifth point is located at 62.5% of the length of the straight line from the center, the sixth point is located at 75.0% of the length of the straight line from the center, and the seventh point is located at 87.5% of the length of the straight line from the center.

In the present disclosure, the first point is sometimes referred to as "12.5% point from the center of the spherical core", the second point is sometimes referred to as "25.0% point from the center of the spherical core", the third point is sometimes referred to as "37.5% point from the center of the spherical core", the fourth point is sometime referred to as "50.0% point from the center of the spherical core", the fifth point is sometimes referred to as "62.5% point from the center of the spherical core", the sixth point is sometimes referred to as "75.0% point from the center of the spherical core", and the seventh point is sometime referred to as "87.5% point from the center of the spherical core".

The hardness difference (C1–C0) between the center hardness (C0) and the hardness (C1) at 12.5% point from the center of the spherical core is more than 0, preferably 0.5 or more, more preferably 1.0 or more, and is 6.0 or less, preferably or less, more preferably 5.0 or less in Shore C hardness.

The hardness difference (C2–C1) between the hardness (C1) at 12.5% point from the center and the hardness (C2) at 25.0% point from the center of the spherical core is more than 0, preferably 0.5 or more, more preferably 1.0 or more, and is 6.0 or less, preferably 5.5 or less, more preferably 5.0 or less in Shore C hardness.

The hardness difference (C3–C2) between the hardness (C2) at 25.0% point from the center and the hardness (C3) at 37.5% point from the center of the spherical core is more than 0, preferably 0.5 or more, more preferably 1.0 or more, and is 6.0 or less, preferably 5.5 or less, more preferably 5.0 or less in Shore C hardness.

The hardness difference (C4–C3) between the hardness (C3) at 37.5% point from the center and the hardness (C4) at 50.0% point from the center of the spherical core is more than 0, preferably 0.5 or more, more preferably 1.0 or more, and is 6.0 or less, preferably 5.5 or less, more preferably 5.0 or less in Shore C hardness.

The formula (5) specifies the hardness difference (C5–C4) between the hardness (C4) at 50.0% point from the center and the hardness (C5) at 62.5% point from the center of the spherical core. The hardness difference (C5–C4) is 5.0 or more, preferably 5.5 or more, more preferably 6.0 or more, and is preferably 12.0 or less, more preferably 11.0 or less, and even more preferably 10.0 or less in Shore C hardness. If the hardness difference (C5–C4) is 5.0 or more, a high initial velocity is obtained on driver shots while improving the spin rate on middle iron shots.

The formulae (6) to (8) specify the hardness distribution in the vicinity of the surface of the spherical core. If a portion having an excessively large hardness gradient exists in the vicinity of the surface of the spherical core, the deformation amount at that portion is large and the golf ball does not deform as a whole on driver shots, thus the resilience performance is lowered. In addition, if a portion having an excessively large hardness gradient exists in the vicinity of the surface of the spherical core, the deformation in the vicinity of the surface of the spherical core is large and the energy loss is great on middle iron shots, thus the spin rate is lowered on middle iron shots. Thus, if the formulae (6) to (8) are satisfied, a good balance is struck between the flight distance on driver shots and the spin rate on middle iron shots.

The hardness difference (C6–C5) between the hardness (C5) at 62.5% point from the center and the hardness (C6) at 75.0% point from the center of the spherical core is more than 0, preferably 0.5 or more, more preferably 1.0 or more, and is 3.5 or less, preferably 3.0 or less, more preferably 2.5 or less in Shore C hardness.

The hardness difference (C7–C6) between the hardness (C6) at 75.0% point from the center and the hardness (C7) at 87.5% point from the center of the spherical core is more than 0, preferably 0.5 or more, more preferably 1.0 or more, and is 3.5 or less, preferably 3.0 or less, more preferably 2.5 or less in Shore C hardness.

The hardness difference (C8–C7) between the hardness (C7) at 87.5% point from the center and the surface hardness (C8) of the spherical core is more than 0, preferably 0.5 or more, more preferably 1.0 or more, and is 3.5 or less, preferably 3.0 or less, more preferably 2.5 or less in Shore C hardness.

The hardness (C3), (C4), (C5) and (C6) of the spherical core in Shore C hardness preferably satisfy the following relationship.

$$1.0\leq \{(C5-C4)-(C4-C3)\} \tag{9}$$

If the formula (9) is satisfied, the spin rate on middle iron shots is further enhanced, and the spin rate on driver shots is further lowered. The difference $\{(C5-C4)-(C4-C3)\}$ is preferably 1.0 or more, more preferably 1.5 or more, and even more preferably 2.0 or more, and is preferably 10.0 or less, more preferably 9.0 or less, and even more preferably 8.0 or less in Shore C hardness.

The hardness (C4), (C5) and (C6) of the spherical core in Shore C hardness preferably satisfy the following relationship. If the formula (10) is satisfied, the spin rate on middle iron shots is further enhanced, and a higher initial velocity on driver shots is obtained.

$$1.0\leq \{(C5-C4)-(C6-C5)\} \tag{10}$$

The difference {(C5−C4)−(C6−C5)} is preferably 1.0 or more, more preferably 1.5 or more, and even more preferably 2.0 or more, and is preferably 10.0 or less, more preferably 9.0 or less, and even more preferably 8.0 or less in Shore C hardness.

The hardness (C0), (C4), (C5) and (C8) in Shore C hardness preferably satisfy the formula (11). If the formula (11) is satisfied, the spin rate on middle iron shots is further enhanced, and the spin rate on driver shots is further lowered.

$$(C4-C0)>(C5-C4)>(C8-C5) \quad (11)$$

The hardness (C0) and (C2) in Shore C hardness preferably satisfy the formula (12). If the formula (12) is satisfied, the deformation amount in the vicinity of the center of the spherical core is larger and the recoil action on driver shots is greater, thus the spin rate on driver shots is further lowered.

$$5.5 \leq (C2-C0) \quad (12)$$

The hardness difference (C2−C0) is preferably 5.5 or more, more preferably 6.0 or more, and even more preferably 6.5 or more, and is preferably 12.0 or less, more preferably 11.0 or less, and even more preferably 10.0 or less in Shore C hardness.

The hardness (C0), (C2), (C4) and (C5) in Shore C hardness preferably satisfy the formula (13). If the formula (13) is satisfied, the spin rate on middle iron shots is further enhanced, and the spin rate on driver shots is further lowered.

$$0.5 \leq \{(C2-C0)/(C5-C4)\} \quad (13)$$

The ratio {(C2−C0)/(C5−C4)}(ratio in Shore C hardness) is preferably 0.5 or more, more preferably 0.6 or more, and even more preferably 0.7 or more, and is preferably 3.5 or less, more preferably 3.3 or less, and even more preferably 3.0 or less.

The hardness (C0), (C2) and (C4) in Shore C hardness preferably satisfy the formula (14). If the formula (14) is satisfied, the spin rate on middle iron shots is further enhanced, and the spin rate on driver shots is further lowered.

$$1.0 \leq \{(C2-C0)/(C4-C2)\} \quad (14)$$

The ratio {(C2−C0)/(C4−C2)}(ratio in Shore C hardness) is preferably 1.0 or more, more preferably 1.2 or more, and even more preferably 1.4 or more, and is preferably 6.5 or less, more preferably 6.0 or less, and even more preferably 5.5 or less.

The hardness (C0), (C2), (C6) and (C8) in Shore C hardness preferably satisfy the formula (15). If the formula (15) is satisfied, the spherical core as a whole deforms in a good balance on driver shots, thus the resilience performance is further enhanced. In addition, the energy loss on middle iron shots is lowered, thus the spin rate on middle iron shots is further enhanced.

$$0 \leq [\{(C2-C0)/2\}-\{(C8-C6)/2\}] \quad (15)$$

The difference [{(C2−C0)/2}−{(C8−C6)/2}] is preferably 0 or more, more preferably 0.5 or more, and even more preferably 1.0 or more, and is preferably 4.0 or less, more preferably 3.5 or less, and even more preferably 3.0 or less in Shore C hardness.

The hardness (C0), (C2), (C5) and (C7) in Shore C hardness preferably satisfy the formula (16). If the formula (16) is satisfied, the spherical core as a whole deforms in a good balance on driver shots, thus the resilience performance is further enhanced. In addition, the energy loss on middle iron shots is lowered, thus the spin rate on middle iron shots is further enhanced.

$$0 \leq [\{(C2-C0)/2\}-\{(C7-C5)/2\}] \quad (16)$$

The difference [{(C2−C0)/2}−{(C7−C5)/2}] is preferably 0 or more, more preferably 0.5 or more, and even more preferably 1.0 or more, and is preferably 4.0 or less, more preferably 3.5 or less, and even more preferably 3.0 or less in Shore C hardness.

The hardness (C0), (C2), (C4) and (C5) in Shore C hardness preferably satisfy the formula (17). If the formula (17) is satisfied, the spin rate on middle iron shots is further enhanced, and the spin rate on driver shots is further lowered.

$$0 \leq [\{(C5-C4)/2\}-\{(C2-C0)/2\}] \quad (17)$$

The difference [(C5−C4)−{(C2−C0)/2}] is preferably 0 or more, more preferably or more, and even more preferably 1.0 or more, and is preferably 6.0 or less, more preferably 5.5 or less, and even more preferably 5.0 or less in Shore C hardness.

The hardness difference (C4−C0) between the center hardness (C0) and the hardness (C4) at 50.0% point from the center of the spherical core is preferably more than 0, more preferably 3.0 or more, and even more preferably 6.0 or more, and is preferably 24.0 or less, more preferably 22.0 or less, and even more preferably 20.0 or less in Shore C hardness.

The hardness difference (C8−C5) between the hardness (C5) at 62.5% point from the center and the surface hardness (C8) of the spherical core is preferably 0 or more, more preferably 1.0 or more, and even more preferably 2.0 or more, and is preferably 10.5 or less, more preferably 10.0 or less, and even more preferably 9.5 or less in Shore C hardness.

The hardness difference (C8−C0) between the center hardness (C0) and the surface hardness (C8) of the spherical core is preferably 18.0 or more, more preferably 19.0 or more, and even more preferably 20.0 or more, and is preferably 32.0 or less, more preferably 30.0 or less, and even more preferably 28.0 or less in Shore C hardness. If the hardness difference (C8−C0) falls within the above range, the outer-hard and inner-soft degree of the hardness distribution of the whole spherical core is greater and the recoil effect is greater, thus the spin rate on driver shots is further lowered and the flight distance is enhanced.

The hardness (C0), (C2), (C4) and (C8) in Shore C hardness preferably satisfy the formula (12). If the formula (12) is satisfied, the spin rate on middle iron shots is further enhanced, and the spin rate on driver shots is further lowered.

$$\{(C8-C4)/(C2-C0)\} \leq 3.0 \quad (12)$$

The ratio {(C8−C4)/(C2−C0)} is preferably 0 or more, more preferably 0.5 or more, and even more preferably 1.0 or more, and is preferably 3.0 or less, more preferably 2.5 or less, and even more preferably 2.0 or less.

The ratio (Cbmax/Cbmin) is preferably 4.0 or more where Cbmax is a maximum value and Cbmin is a minimum value among the hardness difference (C1-between the hardness (C1) and the hardness (C0), the hardness difference (C2−C1) between the hardness (C2) and the hardness (C1), the hardness difference (C3−C2) between the hardness (C3) and the hardness (C2), the hardness difference (C4−C3) between the hardness (C4) and the hardness (C3), the hardness difference (C5−C4) between the hardness (C5) and the hardness (C4), the hardness difference (C6−C5) between the hardness (C6) and the hardness (C5), the hardness difference (C7−C6) between the hardness (C7) and the hardness (C6), and the hardness difference (C8−C7) between the hardness (C8) and the hardness (C7) of the spherical core in Shore C hardness. If the spherical core as a whole has a portion with a great hardness difference and a portion with a small hardness difference, a portion where the golf ball bends and a portion inhibiting the movement of the golf ball become available when the golf ball is hit, thus the deformed portion is changed into the resilience without waste. It is noted that the hardness difference (C5−C4) is preferably Cbmax.

The center hardness (C0) of the spherical core is preferably 50.0 or more, more preferably 52.0 or more, and even more preferably 54.0 or more, and is preferably 70.0 or less, more preferably 68.0 or less, and even more preferably 66.0 or less in Shore C hardness. If the center hardness (C0) is 50.0 or more, since the ball is not crushed too much when the ball deforms, the ball exerts the resilience performance, and if the center hardness (C0) is 70.0 or less, the inside of the ball also deforms, thus the feeling is better.

The surface hardness (C8) of the spherical core is preferably 70.0 or more, more preferably 72.0 or more, and even more preferably 74.0 or more, and is preferably 90.0 or less, more preferably 88.0 or less, and even more preferably 86.0 or less in Shore C hardness. If the surface hardness (C8) is 70.0 or more, the ball is not crushed too much and exerts the resilience performance, and if the surface hardness (C8) is 90.0 or less, the ball has better durability.

The hardness (C4) at 50.0% point from the center of the spherical core is preferably 60.0 or more, more preferably 62.0 or more, and even more preferably 64.0 or more, and is preferably 80.0 or less, more preferably 78.0 or less, and even more preferably 76.0 or less in Shore C hardness. If the hardness (C4) is 60.0 or more, the ball is not crushed too much and exerts the resilience performance, and if the hardness (C4) is 80.0 or less, occurrence of the recoil is promoted, thus the spin rate on driver shots is further lowered.

The diameter of the spherical core is preferably 34.8 mm or more, more preferably 36.3 mm or more, and even more preferably 37.8 mm or more, and is preferably 42.2 mm or less, more preferably 41.8 mm or less, even more preferably 41.2 mm or less, and most preferably 40.8 mm or less. If the diameter of the spherical core is 34.8 mm or more, the resilience is better. On the other hand, if the diameter of the spherical core is 42.2 mm or less, the cover functions better.

When the spherical core has a diameter in the range from 34.8 mm to 42.2 mm, the compression deformation amount of the core (shrinking amount of the core along the compression direction) when applying a load from an initial load of 98 N to a final load of 1275 N is preferably 2.0 mm or more, more preferably 2.3 mm or more, and even more preferably 2.5 mm or more, and is preferably 5.0 mm or less, more preferably 4.5 mm or less, and even more preferably 4.3 mm or less. If the compression deformation amount is 2.0 mm or more, the shot feeling is better, and if the compression deformation amount is 5.0 mm or less, the resilience is better.

The spherical core may have either a single layered construction or a multiple layered construction composed of at least two layers, and preferably has the single layered construction. Unlike the multiple layered spherical core, the single layered spherical core does not have an energy loss at the interface of the multiple layered spherical core when being hit, and thus has better resilience.

In the first embodiment of the present disclosure, a golf ball comprises a spherical core and a cover covering the spherical core, wherein when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at 50.0% point from the center, a hardness (C5) at 62.5% point from the center, a hardness (C6) at % point from the center, a hardness (C7) at 87.5% point from the center and a surface hardness (C8) of the spherical core in Shore C hardness satisfy the formulae (1) to (9).

$$0<(C1-C0)\leq 6.0 \quad (1)$$

$$0<(C2-C1)\leq 6.0 \quad (2)$$

$$0<(C3-C2)\leq 6.0 \quad (3)$$

$$0<(C4-C3)\leq 6.0 \quad (4)$$

$$5\leq (C5-C4) \quad (5)$$

$$0<(C6-C5)\leq 3.5 \quad (6)$$

$$0<(C7-C6)\leq 3.5 \quad (7)$$

$$0<(C8-C7)\leq 3.5 \quad (8)$$

$$1.0\leq \{(C5-C4)-(C4-C3)\} \quad (9)$$

The spherical core largely deforms on driver shots as a whole. For that reason, if the lower limit value of the formulae (1) to (4) and (6) to (8) is more than 0, and the lower limit value of the formula (5) is 5.0, the hardness distribution of the spherical core has an outer-hard and inner-soft structure as a whole, the recoil action is obtained and thus the spin rate is lowered on driver shots. In addition, If the upper limit value of the formulae (1) to (4) is 6.0, and the upper limit value of the formulae (6) to (8) is 3.5, the deformation balance of the whole spherical core on driver shots is good and thus the resilience performance is enhanced. Thus, the flight distance performance on driver shots is enhanced.

The deformation amount of the spherical core is smaller on middle iron shots than that on driver shots and the hardness in the vicinity of the surface of the spherical core becomes important. For that reason, if the upper limit value of the formulae (6) to (8) is 3.5, the deformation amount in the vicinity of the surface of the spherical core on middle iron shots is inhibited, thus the spin rate on middle iron shots improves. Further, if the formulae (5) and (9) are satisfied, the deformation amount in the region from 50% point from the center of the spherical core to 62.5% point from the center of the spherical core is greater and the deformation amount in the vicinity of the center is smaller on middle iron shots. As a result, the recoil action is lowered, thus the spin rate on middle iron shots is further enhanced.

In the second embodiment of the present disclosure, a golf ball comprises a spherical core and a cover covering the spherical core, wherein when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at 50.0% point from the center, a hardness (C5) at 62.5% point from the center, a hardness (C6) at % point from the center, a hardness (C7) at 87.5% point from the center and a surface hardness (C8) of the spherical core in Shore C hardness satisfy the formulae (1) to (8) and (12).

$$0<(C1-C0)\le 6.0 \tag{1}$$

$$0<(C2-C1)\le 6.0 \tag{2}$$

$$0<(C3-C2)\le 6.0 \tag{3}$$

$$0<(C4-C3)\le 6.0 \tag{4}$$

$$5\le (C5-C4) \tag{5}$$

$$0<(C6-C5)\le 3.5 \tag{6}$$

$$0<(C7-C6)\le 3.5 \tag{7}$$

$$0<(C8-C7)\le 3.5 \tag{8}$$

$$\{(C8-C4)/(C2-C0)\}\le 3.0 \tag{12}$$

The spherical core largely deforms on driver shots as a whole. For that reason, if the lower limit value of the formulae (1) to (4) and (6) to (8) is more than 0, and the lower limit value of the formula (5) is 5.0, the hardness distribution of the spherical core has an outer-hard and inner-soft structure as a whole, the recoil action is obtained and thus the spin rate is lowered on driver shots. In addition, if the lower limit value of the formula (12) is 5.5, the deformation amount in the vicinity of the center of the spherical core is larger and the recoil action on driver shots is greater, thus the spin rate on driver shots is further lowered. Further, if the upper limit value of the formulae (1) to (4) is 6.0, and the upper limit value of the formulae (6) to (8) is 3.5, the deformation balance of the whole spherical core on driver shots is better and the resilience performance is enhanced. Thus, the flight distance performance on driver shots is enhanced.

The deformation amount of the spherical core is smaller on middle iron shots than that on driver shots and the hardness in the vicinity of the surface of the spherical core becomes important. For that reason, if the upper limit value of the formulae (6) to (8) is 3.5, the deformation amount in the vicinity of the surface of the spherical core on middle iron shots is inhibited, thus the spin rate on middle iron shots improves. Further, if the formula (5) is satisfied, the deformation amount in the region from 50% point from the center of the spherical core to 62.5% point from the center of the spherical core is greater and the deformation amount in the vicinity of the center is smaller on middle iron shots. As a result, the recoil action is lowered, thus the spin rate on middle iron shots is further enhanced.

In the third embodiment of the present disclosure, a golf ball comprises a spherical core and a cover covering the spherical core, wherein when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at 50.0% point from the center, a hardness (C5) at 62.5% point from the center, a hardness (C6) at % point from the center, a hardness (C7) at 87.5% point from the center and a surface hardness (C8) of the spherical core in Shore C hardness satisfy the formulae (1) to (8) and (15).

$$0<(C1-C0)\le 6.0 \tag{1}$$

$$0<(C2-C1)\le 6.0 \tag{2}$$

$$0<(C3-C2)\le 6.0 \tag{3}$$

$$0<(C4-C3)\le 6.0 \tag{4}$$

$$5\le (C5-C4) \tag{5}$$

$$0<(C6-C5)\le 3.5 \tag{6}$$

$$0<(C7-C6)\le 3.5 \tag{7}$$

$$0<(C8-C7)\le 3.5 \tag{8}$$

$$0\le [\{(C2-C0)/2\}-\{(C8-C6)/2\}] \tag{15}$$

The spherical core largely deforms on driver shots as a whole. For that reason, if the lower limit value of the formulae (1) to (4) and (6) to (8) is more than 0, and the lower limit value of the formula (5) is 5.0, the hardness distribution of the spherical core has an outer-hard and inner-soft structure as a whole, the recoil action is obtained and thus the spin rate is lowered on driver shots. In addition, if the upper limit value of the formulae (1) to (4) is 6.0, and the upper limit value of the formulae (6) to (8) is 3.5, the deformation balance of the whole spherical core on driver shots is better and thus the resilience performance is enhanced. Further, if the formula (15) is satisfied, the hardness gradient in the vicinity of the center of the spherical core is larger than the hardness gradient in the vicinity of the surface of the spherical core and the whole spherical core deforms in a better balance on driver shots, thus the resilience performance is further enhanced. Thus, the flight distance performance on driver shots is enhanced.

The deformation amount of the spherical core is smaller on middle iron shots than that on driver shots and the hardness in the vicinity of the surface of the spherical core becomes important. For that reason, if the upper limit value of the formulae (6) to (8) is 3.5, the deformation amount in the vicinity of the surface of the spherical core on middle iron shots is inhibited, thus the spin rate on middle iron shots improves. In addition, if the formula (5) is satisfied, the deformation amount in the region from 50% point from the center of the spherical core to 62.5% point form the center of the spherical core is greater and the deformation amount in the vicinity of the center is smaller on middle iron shots. As a result, the recoil action is lowered, thus the spin rate on middle iron shots is further enhanced. Further, if the formula (15) is satisfied, the hardness gradient in the vicinity of the surface of the spherical core is smaller than the hardness gradient in the vicinity of the center of the spherical core, the energy loss on middle iron shots is lowered, thus the spin rate on middle iron shots is further enhanced.

[Rubber Composition]

The spherical core is preferably formed from a core rubber composition containing (a) a base rubber, (b) an α,β-unsaturated carboxylic acid having 3 to 8 carbon atoms and/or a metal salt thereof as a co-crosslinking agent, and (c) a crosslinking initiator. The spherical core is obtained by molding the core rubber composition in a mold. The molding condition is not particularly limited, and the molding is generally carried out at a temperature in a range from 130° C. to 200° C. under a pressure of 2.9 MPa to 11.8 MPa for 10 minutes to 60 minutes.

The spherical core is preferably formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position. If the rubber composition containing the specific materials is used, the hardness distribution of the obtained spherical core is easily controlled.

[(a) Base Rubber]

As (a) the base rubber, a natural rubber and/or a synthetic rubber is used. As (a) the base rubber, for example, a polybutadiene rubber, a natural rubber, a polyisoprene rubber, a styrenebutadiene rubber, or an ethylene-propylene-diene rubber (EPDM) can be used. These rubbers may be used solely, or at least two of these rubbers may be used in combination. Among them, typically preferred is a high cis-polybutadiene having a cis-1,4 bond in an amount of 40 mass % or more, preferably 80 mass % or more, more preferably 90 mass % or more, and even more preferably 95 mass % or more in view of its superior resilience.

From the viewpoint of obtaining a core having higher resilience, the amount of the high-cis polybutadiene in the base rubber is preferably 60 mass % or more, more preferably 80 mass % or more, and even more preferably 90 mass % or more. It is also preferable that (a) the base rubber consists of the high-cis polybutadiene.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is 2.0 mass % or less, the resilience is further enhanced.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferable.

The high-cis polybutadiene preferably has a Mooney viscosity ($ML_{1+4}(100°$ C.)) of 30 or more, more preferably 32 or more, and even more preferably 35 or more, and preferably has a Mooney viscosity ($ML_{1+4}(100°$ C.)) of 140 or less, more preferably 120 or less, even more preferably 100 or less, and most preferably 55 or less. It is noted that the Mooney viscosity ($ML_{1+4}(100°$ C.)) in the present disclosure is a value measured according to JIS K6300 using an L rotor under the conditions of preheating time: 1 minute, rotor rotation time: 4 minutes, and temperature: 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.0 or less. If the molecular weight distribution (Mw/Mn) of the high-cis polybutadiene falls within the above range, the processability when molding the core is better, and the obtained spherical core has better resilience. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

(b) Co-Crosslinking Agent (b) The α,β-unsaturated carboxylic acid having 3 to 8 carbon atoms and/or the metal salt thereof is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferable. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferable, because zinc acrylate enhances the resilience of the resultant golf ball. It is noted that the α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of the component (b) is 15 parts by mass or more, the amount of (c) the crosslinking initiator necessary for obtaining an appropriate hardness of the core formed from the core rubber composition is reduced, and the obtained golf ball has enhanced resilience. In addition, if the amount of the component (b) is 50 parts by mass or less, the obtained golf ball has better shot feeling.

(c) Crosslinking Initiator (c) The crosslinking initiator is blended in order to crosslink (a) the base rubber component. As (c) the crosslinking initiator, an organic peroxide is preferable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy) hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the component (c) is 0.2 part by mass or more, the core formed from the core rubber composition is not excessively soft and thus the obtained golf ball has enhanced resilience, and if the amount of the component (c) is 5.0 parts by mass or more, the obtained golf ball has better resilience and durability.

(d) Monophenol Compound Having a Substituent Group Only at p-Position (d) The monophenol compound having the substituent group only at the p-position is a compound having a substituent group only at p-position of a monophenol. The monophenol compound having the substituent group only at the p-position is a compound having a substituent group directly bonding at p-position to the single hydroxy group of the phenol, and having no substituent group at o-position and m-position to the hydroxy group. Examples of the substituent group at p-position include an alkoxy group, a halogen group, a hydrocarbon group, a nitro group, a cyano group, an amino group and a hydroxy group, and the alkoxy group is preferable.

(d) The monophenol compound having the substituent group only at the p-position is preferably a compound represented by the following general formula (1).

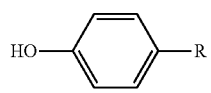

(1)

[In the general formula (1), R represents an alkoxy group, a halogen group, a hydrocarbon group, a nitro group, a cyano group, an amino group, or a hydroxy group.

Examples of the alkoxy group include a group having an oxygen atom bonding to an alkyl group having 1 or more carbon atoms. The alkoxy group is not particularly limited, as long as the alkoxy group has 1 or more carbon atoms, and the alkoxy group preferably has 1 to 20 carbon atoms, more preferably has 1 to 10 carbon atoms, and even more preferably has 1 to 8 carbon atoms. The alkyl moiety of the alkoxy group may be linear, branched or cyclic. Specific examples of the alkyl moiety of the alkoxy group include a linear or branched alkyl group such as a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a n-heptyl group, an isoheptyl group, a sec-heptyl group, a tert-heptyl group, a n-octyl group, an isooctyl group, a sec-octyl group, and a tert-octyl group; and a cyclic alkyl group such as a cyclobutyl group, a cyclopentyl group, a cyclohexyl group, a cycloheptyl group, and a cyclooctyl group. Specific examples of the alkoxy group include a methoxy group, an ethoxy group, a propoxy group (including n-, iso-structure), a butoxy group (including n-, iso-, sec-, tert-, cyclo-structure), a pentyloxy group (including n-, iso-, sec-, tert-, cyclo-structure), a hexyloxy group (including n-, iso-, sec-, tert-, cyclo-structure), a heptyloxy group (including n-, iso-, sec-, tert-, cyclo-structure), and an octyloxy group (including n-, iso-, sec-, tert-, cyclo-structure). It is noted that the alkoxy group may have a substituent group (e.g. halogen group, hydroxy group, amino group, nitro group, and cyano group).

Examples of the halogen group include a fluoro group, a chloro group, a bromo group, and an iodo group.

Examples of the hydrocarbon group include an alkyl group, an alkenyl group, an alkynyl group, an aralkyl group, and an aryl group.

The alkyl group is not particularly limited, as long as the alkyl group has 1 or more carbon atoms, and the alkyl group preferably has 1 to 20 carbon atoms, more preferably has 1 to 10 carbon atoms, and even more preferably has 1 to 8 carbon atoms. The alkyl group may be linear, branched or cyclic, and specific examples thereof include a linear or branched alkyl group such as a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a n-hexyl group, an isohexyl group, a sec-hexyl group, a tert-hexyl group, a n-heptyl group, an isoheptyl group, a sec-heptyl group, a tert-heptyl group, a n-octyl group, an isooctyl group, a sec-octyl group, and a tert-octyl group; and a cyclic alkyl group such as a cyclobutyl group, a cyclopentyl group, a cyclohexyl group, a cycloheptyl group, and a cyclooctyl group. It is noted that the alkyl group may have a substituent group (e.g. a halogen group, a hydroxy group, an amino group, a nitro group, and a cyano group).

The alkenyl group is not particularly limited, as long as the alkenyl group has 2 or more carbon atoms. The alkenyl group preferably has 2 to 20 carbon atoms, more preferably has 2 to 10 carbon atoms, and even more preferably has 2 to 8 carbon atoms. Specific examples of the alkenyl group include a vinyl group, an allyl group, a propenyl group, an isopropenyl group, a butenyl group, an isobutenyl group, and a hexenyl group. It is noted that the alkenyl group may have a substituent group (e.g. an alkyl group, a halogen group, a hydroxy group, an amino group, a nitro group, a cyano group).

The alkynyl group is not particularly limited, as long as the alkynyl group has 2 or more carbon atoms. The alkynyl group preferably has 2 to 20 carbon atoms, more preferably has 2 to 10 carbon atoms, and even more preferably has 2 to 8 carbon atoms. Specific examples of the alkynyl group include an ethynyl group, a 1-propynyl group, a 2-propynyl group (propargyl group), and a butynyl group. It is noted that the alkynyl group may have a substituent group (e.g. an alkyl group, a halogen group, a hydroxy group, an amino group, a nitro group, a cyano group).

The aralkyl group is not particularly limited, as long as the aralkyl group has 7 or more carbon atoms. The aralkyl group preferably has 7 to 20 carbon atoms, more preferably has 7 to 10 carbon atoms, and even more preferably has 7 to 8 carbon atoms. Specific examples of the aralkyl group include a benzyl group, a phenylethyl group, a phenylbutyl group, and an α-cumyl group. It is noted that the aralkyl group may have a substituent group (e.g. an alkyl group, a halogen group, an amino group, a nitro group, a cyano group).

The aryl group is not particularly limited, as long as the aryl group has 6 or more carbon atoms. The aryl group preferably has 6 to 20 carbon atoms, more preferably has 6 to 15 carbon atoms, and even more preferably has 6 to 10 carbon atoms. Specific examples of the aryl group include a phenyl group, and a naphthyl group. It is noted that the aryl group may have a substituent group (e.g. an alkyl group, a halogen group, an amino group, a nitro group, a cyano group).

In the general formula (1), the substituent group represented by R is preferably the alkoxy group, more preferably the alkoxy group having 1 to 8 carbon atoms, and even more preferably a methoxy group, an ethoxy group, a propoxy group or a butoxy group.

(d) The monophenol compound having the substituent group only at the p-position may be used solely, or two or more of them may be used in combination.

The amount of (d) the monophenol compound having the substituent group only at the p-position is preferably 0.05 part by mass or more, more preferably 0.07 part by mass or more, and even more preferably 0.10 part by mass or more, and is preferably 2.0 parts by mass or less, more preferably 1.8 parts by mass or less, and even more preferably 1.6 parts by mass or less, with respect to 100 parts by mass of (a) the base rubber. If the amount of (d) the monophenol compound having the substituent group only at the p-position is 0.05 part by mass or more, the effect of adding (d) the monophenol compound having the substituent group only at the p-position is great, and if the amount of (d) the monophenol compound having the substituent group only at the p-position is 2.0 parts by mass or less, the flight distance on driver shots is further enhanced.

The mass ratio (component (b)/component (d)) of the component (b) to the component (d) is preferably 25 or more, more preferably 30 or more, even more preferably 35 or more, particularly preferably 100 or more, and most preferably 200 or more, and is preferably 500 or less, more preferably 450 or less, and even more preferably 400 or less. If the mass ratio (component (b)/component (d)) falls within the above range, the shot feeling is better and the flight distance on driver shots is further enhanced.

The mass ratio (component (c)/component (d)) of the component (c) to the component (d) is preferably 1.0 or more, more preferably 1.5 or more, and even more preferably 2.0 or more, and is preferably 150 or less, more preferably 130 or less, even more preferably 110 or less, particularly preferably 50 or less, and most preferably 20 or less. If the mass ratio (component (c)/component (d)) falls within the above range, the shot feeling is better and the flight distance on driver shots is further enhanced.

(e) Organic Sulfur Compound

The core rubber composition preferably further contains (e) an organic sulfur compound. If (e) the organic sulfur compound is contained, the obtained core has higher resilience.

Examples of (e) the organic sulfur compound include at least one compound selected from the group consisting of thiols (thiophenols and thionaphthols), polysulfides, thiazoles, thiurams, thiocarboxylic acids, dithiocarboxylic acids, sulfenamides, and dithiocarbamates.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a divalent metal salt is preferable, and a zinc salt is more preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. As the metal salt, a divalent metal salt is preferable, and a zinc salt is more preferable.

The polysulfides are organic sulfur compounds having a polysulfide bond, and examples thereof include disulfides, trisulfides, and tetrasulfides. As the polysulfides, diphenylpolysulfides are preferable.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, bis(2,4,5,6-tetraiodophenyl)disulfide, and bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiazoles include 2-mercaptobenzothiazole, di-2-benzothiazolyl disulfide, 2-(N,N-diethylthiocarbamoylthio)benzothiazole, 2-(4'-morpholinodithio)benzothiazole, 4-methyl-2-mercaptobenzothiazole, di-(4-methyl-2-benzothiazolyl)disulfide, 5-chloro-2-mercaptobenzothiazole, 2-mercapto-6-nitrobenzothiazole, 2-mercapto-naphtho[1,2-d]thiazole, 2-mercapto-5-methoxybenzothiazole, 6-amino-2-mercaptobenzothiazole, and a metal salt thereof.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

As (e) the organic sulfur compound, at least one compound selected from the group consisting of the thiophenols substituted with a halogen group, the metal salt of the thiophenols substituted with a halogen group, the diphenyldisulfides substituted with a halogen group, the thiazoles, and the metal salt of the thiazoles, is preferable.

(e) The organic sulfur compound may be used solely or in combination of at least two of them.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of the component (e) falls within the above range, the obtained golf ball has better resilience.

The mass ratio (component (e)/component (d)) of the component (e) to the component (d) is preferably 1.0 or more, more preferably 1.5 or more, and even more preferably 2.0 or more, and is preferably 100 or less, more preferably 90 or less, even more preferably 80 or less, particularly preferably 40 or less, and most preferably 20 or less. If the mass ratio (component (e)/component (d)) falls within the above range, the recoil effect on driver shots is greater, thus the flight distance is further enhanced.

(f) Metal Compound

In the case that the core rubber composition contains only the α,β-unsaturated carboxylic acid having 3 to 8 carbon atoms as the co-crosslinking agent, the core rubber composition preferably further contains (f) a metal compound. This is because neutralizing the α,β-unsaturated carboxylic acid having 3 to 8 carbon atoms with the metal compound in the core rubber composition provides substantially the same effect as using the metal salt of the α,β-unsaturated carboxylic acid having 3 to 8 carbon atoms as the co-crosslinking agent. It is noted that in case of using the α,β-unsaturated carboxylic acid having 3 to 8 carbon atoms and the metal salt thereof in combination as the co-crosslinking agent, (f) the metal compound may be used as an optional component.

(f) The metal compound is not particularly limited, as long as the metal compound neutralizes (b) the α,β-unsaturated carboxylic acid having 3 to 8 carbon atoms in the core rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience.

(f) The metal compound may be used solely or in combination of two or more of them. In addition, the amount of (f) the metal compound may be appropriately adjusted in accordance with the desired neutralization degree of (b) the α,β-unsaturated carboxylic acid having 3 to 8 carbon atoms.

(g) Carboxylic Acid and/or Salt Thereof

The core rubber composition may further contain (g) a carboxylic acid and/or a salt thereof. If (g) the carboxylic acid and/or the salt thereof is contained, the obtained spherical core has a greater degree of the outer-hard and inner-soft structure. Examples of (g) the carboxylic acid and/or the salt thereof include an aliphatic carboxylic acid, a salt of an aliphatic carboxylic acid, an aromatic carboxylic acid, and a salt of an aromatic carboxylic acid. (g) The carboxylic acid and/or the salt thereof may be used solely or in combination of two or more of them.

The carboxylic acid preferably has 1 or more carbon atoms, and preferably has or less carbon atoms, more preferably has 18 or less carbon atoms, and even more preferably has 13 or less carbon atoms. It is noted that (g) the carboxylic acid and/or the salt thereof excludes the α,β-unsaturated carboxylic acid having 3 to 8 carbon atoms and/or the metal salt thereof used as (b) the co-crosslinking agent.

Preferable examples of the carboxylic acid and/or the salt thereof include a saturated aliphatic carboxylic acid such as caprylic acid (octanoic acid), pelargonic acid (nonanoic acid), capric acid (decanoic acid), lauric acid, myristic acid, palmitic acid, stearic acid, and behenic acid; an unsaturated aliphatic carboxylic acid such as palmitoleic acid, oleic acid, linoleic acid and arachidonic acid; an aromatic carboxylic acid such as benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalene carboxylic acid, anthracene carboxylic acid, furan carboxylic acid and thenoylic acid; and a potassium salt, magnesium salt, calcium salt, aluminum salt, zinc salt, iron salt, copper salt, nickel salt, cobalt salt of these carboxylic acids. Among them, the aromatic carboxylic acid and/or the salt thereof is preferable, the carboxylic acid having the benzene ring and/or the salt thereof is more preferable.

The amount of (g) the carboxylic acid and/or the salt thereof is preferably 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of the component (g) is 0.5 part by mass or more, the spherical core has a greater degree of the outer-hard and inner-soft structure, and if the amount of the component (g) is parts by mass or less, lowering in the core hardness is suppressed, and the resilience is better.

The core rubber composition may further contain additives such as a pigment, a filler for adjusting a weight or the like, a peptizing agent, a softening agent or the like, where necessary.

The filler blended in the core rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. If the amount of the filler is 30 parts by mass or less, the resilience is better.

The amount of the peptizing agent is preferably 0.1 part by mass or more and 5 parts by mass or less with respect to 100 parts by mass of (a) the base rubber.

The core rubber composition is preferably prepared by mixing and kneading the materials. The kneading method is not particularly limited, for example, a conventional kneading machine such as a kneading roll, a Banbury mixer, and a kneader can be used in the kneading method.

[Cover and Intermediate Layer]

The golf ball comprises a cover covering the spherical core. The cover is the outermost layer of the golf ball body excluding a paint film.

The material hardness of the cover composition constituting the cover is preferably set in accordance with the desired performance of the golf ball. For example, in case of a so-called distance golf ball which focuses on a flight distance, the material hardness of the cover composition is preferably 50 or more, more preferably 55 or more, and even more preferably 60 or more, and is preferably 80 or less, more preferably 70 or less, and even more preferably 68 or less in shore D hardness. If the material hardness of the cover composition is 50 or more, the obtained golf ball has a higher launch angle and a lower spin rate on driver shots and iron shots, and thus travels a greater distance. In addition, if the material hardness of the cover composition is 80 or less, the obtained golf ball has better durability.

Further, in case of a so-called spin golf ball which focuses on controllability, the material hardness of the cover composition is preferably less than more preferably 48 or less, and even more preferably 45 or less, and is preferably 20 or more, more preferably 25 or more, and even more preferably 30 or more in Shore D hardness. If the material hardness of the cover composition is less than 50 in Shore D hardness, the obtained golf ball readily stops on the green due to the high spin rate on approach shots. In addition, if the material hardness of the cover composition is 20 or more in Shore D hardness, the abrasion resistance is enhanced. It is noted that the material hardness of the cover is a slab hardness of the cover composition for forming the cover molded into a sheet shape.

The thickness of the cover is preferably 4.0 mm or less, more preferably 3.0 mm or less, and even more preferably 2.0 mm or less. If the thickness of the cover is 4.0 mm or less, the obtained golf ball has better resilience or shot feeling. The thickness of the cover is preferably 0.3 mm or more, more preferably 0.4 mm or more, and even more preferably 0.5 mm or more. If the thickness of the cover is 0.3 mm or more, the impact durability or wear resistance of the cover is enhanced.

The golf ball may comprise an intermediate layer between the spherical core and the cover. The intermediate layer may be single layered or has two or more layers, and the single layered intermediate layer is preferable.

The material hardness of the intermediate layer composition constituting the intermediate layer is preferably 55 or more, more preferably 57 or more, and even more preferably 59 or more, and is preferably 74 or less, more preferably 72 or less, and even more preferably 70 or less in Shore D hardness. If the material hardness of the intermediate layer composition is 55 or more, the spin rate on driver shots is further lowered and the flight distance is further enhanced, and if the material hardness of the intermediate layer composition is 74 or less, the durability is better. In the case the intermediate layer has two or more layers, the material hardness of the composition constituting the outermost intermediate layer preferably falls within the above range. It is noted that the material hardness of the intermediate layer is a slab hardness of the intermediate layer composition for forming the intermediate layer molded into a sheet shape. In case of multiple intermediate layers, the material hardness of the intermediate layer composition constituting each layer may be identical to or different from each other, but it is preferable that the material hardness of all the intermediate layers falls within the above range.

The thickness of the intermediate layer is preferably 0.8 mm or more, more preferably 0.9 mm or more, and even more preferably 1.0 mm or more, and is preferably 4.0 mm or less, more preferably 3.0 mm or less, and even more preferably 2.0 mm or less. If the thickness of the intermediate layer is 0.8 mm or more, the impact durability is better, and if the thickness of the intermediate layer is 4.0 mm or less, the feeling is better. In the case the intermediate layer has two or more layers, the thickness of the outermost intermediate layer preferably falls within the above range.

The thickness (mm) and material hardness (Shore D) of the intermediate layer, and the thickness (mm) and material hardness (Shore D) of the cover preferably satisfy the formula (21). If the formula (21) is satisfied, the spin performance on approach shots is enhanced, and the recoil effect is greater and the spin rate is further lowered on driver shots.

$$\{(\text{thickness of intermediate layer} \times \text{material hardness of intermediate layer})/(\text{thickness of cover} \times \text{material hardness of cover})\} \geq 4.0 \quad (21)$$

The value of ((thickness of intermediate layer×material hardness of intermediate layer)/(thickness of cover×material hardness of cover)) is preferably 4.0 or more, more preferably 4.5 or more, and even more preferably 5.0 or more, and is preferably 10.0 or less, more preferably 9.0 or less, and even more preferably 8.0 or less.

The cover and the intermediate layer are preferably formed from a cover composition and an intermediate layer composition containing a resin component. Examples of the resin component include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Tefabloc" available from Mitsubishi Chemical Corporation.

Examples of the ionomer resin include a product obtained by neutralizing at least a part of carboxyl groups in a binary copolymer composed of an olefin and an α,β-unsaturated carboxylic acid having 3 to 8 carbon atoms with a metal ion; a product obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include a methyl ester, an ethyl ester, a propyl ester, a n-butyl ester, an isobutyl ester of acrylic acid, methacrylic acid, fumaric acid and maleic acid, and acrylic acid ester or methacrylic acid ester is particularly preferred. Among them, as the ionomer resin, a metal ion neutralized product of ethylene-(meth) acrylic acid binary copolymer or a metal ion neutralized product of ethylene-(meth)acrylic acid-(meth)acrylic acid ester ternary copolymer is preferred.

The cover composition preferably contains a thermoplastic polyurethane elastomer or an ionomer resin as the resin component. It is also preferred that when the ionomer resin is used, a thermoplastic styrene elastomer is used in combination. The amount of the polyurethane or ionomer resin in the resin component of the cover composition is preferably 50 mass % or more, more preferably 60 mass % or more, and even more preferably 70 mass % or more.

The intermediate layer composition preferably contains an ionomer resin as the resin component. It is also preferred that when the ionomer resin is used, a thermoplastic styrene elastomer is used in combination. The amount of the ionomer resin in the resin component of the intermediate layer composition is preferably 50 mass % or more, more preferably 60 mass % or more, and even more preferably 70 mass % or more.

In addition to the resin component, the cover composition and the intermediate layer composition may further contain a pigment component such as a white pigment (e.g. titanium oxide), a blue pigment and a red pigment, a weight adjusting agent such as zinc oxide, calcium carbonate and barium sulfate, a dispersant, an antioxidant, an ultraviolet absorber, a light stabilizer, a fluorescent material or fluorescent brightener.

The amount of the white pigment (e.g. titanium oxide) is preferably 0.5 part or more, more preferably 1 part or more, and is preferably 10 parts or less, more preferably 8 parts or less, with respect to 100 parts by mass of the resin component constituting the cover. If the amount of the white pigment is 0.5 part by mass or more, it is possible to impart the opacity to the resultant cover. In addition, if the amount of the white pigment is 10 parts by mass or less, the durability of the resultant cover is better.

Examples of the method for molding the intermediate layer include, but are not limited to, a method which comprises molding the intermediate layer composition into a hemispherical half shell in advance, covering the spherical core with two of the half shells and performing compression molding; and a method which comprises injection molding the intermediate layer composition directly onto the spherical core to cover the spherical core.

Examples of the method for molding the cover include a method which comprises molding the cover composition into a hollow shell, covering the sphere (spherical core or a sphere having the intermediate layer formed thereon) with a plurality of the hollow shells and performing compression molding (preferably a method which comprises molding the cover composition into a hollow half shell, covering the sphere with two of the half shells and performing compression molding); and a method which comprises injection molding the cover composition directly onto the sphere.

When molding the cover, concave portions called "dimple" are usually formed on the surface of the cover. The total number of dimples formed on the cover is preferably 200 or more and 500 or less. If the total number is 200 or more and 500 or less, the size of the respective dimples is larger, and thus the dimple effect is greater. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball body having the cover formed thereon is ejected from the mold, and is preferably subjected to surface treatments such as deburring, cleaning and sandblast where necessary.

In addition, if desired, a paint film or a mark may also be formed. The thickness of the paint film is not particularly limited, and is preferably 5 μm or more, more preferably 6 μm or more, and even more preferably 7 μm or more, and is preferably 50 μm or less, more preferably 40 μm or less, and even more preferably 30 μm or less. If the thickness of the paint film is 5 μm or more, the paint film is hard to wear off for the continued use of the golf ball, and if the thickness of the paint film is 50 μm or less, the dimple effect is sufficiently obtained and thus the flight performance of the golf ball is enhanced.

[Golf Ball]

Examples of the golf ball according to the present disclosure include a two-piece golf ball composed of a spherical core and a single layered cover covering the spherical core; a three-piece golf ball composed of a spherical core, a single layered intermediate layer covering the spherical core, and a single layered cover covering the intermediate layer; and a multi-piece golf ball composed of a spherical core, at least two intermediate layers covering the spherical core, and a single layered cover covering the intermediate layers. The present disclosure is suitably applied to any one of the above golf balls.

The golf ball preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball has a diameter in the range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.1 mm or more, and even more preferably 2.2 mm or more, and is preferably 3.0 mm or less, more preferably 2.9 mm or less, and even more preferably 2.8 mm or less. If the compression deformation amount is 2.0 mm or more, the golf ball has better shot feeling. On the other hand, if the compression deformation amount is 3.0 mm or less, the resilience is higher.

In the case that the golf ball comprises the intermediate layer, the surface hardness (C8) of the spherical core, the surface hardness of the intermediate layer and the surface hardness of the ball in Shore C hardness preferably satisfy the formula (20).

$$\text{surface hardness of core} < \text{surface hardness of intermediate layer} > \text{surface hardness of ball} \quad (20)$$

FIG. 1 shows one example of the golf ball according to the present disclosure. FIG. 1 is a partially cutaway cross-sectional view showing a golf ball 1 according to one embodiment of the present disclosure. The golf ball 1 has a core 2, an intermediate layer 3 covering the core 2, and a cover 4 covering the intermediate layer 3. A plurality of dimples 41 are formed on the surface of the cover 4. Other portions than the dimples 41 on the surface of the golf ball are lands 42. The golf ball 1 has a paint layer and a mark layer on an outer side of the cover 4, but these layers are not depicted.

Examples

Hereinafter, the present disclosure will be described in detail by way of examples. However, the present disclosure is not limited to the examples described below, and various changes and modifications without departing from the gist of the present disclosure are included in the scope of the present disclosure.

[Evaluation Method]
(1) Compression Deformation Amount (mm)

The deformation amount of the spherical core or golf ball along the compression direction (the shrinking amount of the spherical core or golf ball along the compression direction), when applying a load from an initial load of 98 N to a final load of 1275 N to the spherical core or golf ball, was measured.

(2) Core Hardness (Shore C Hardness)

The hardness measured on the surface of the core was adopted as the surface hardness of the core. In addition, the core was cut into two hemispheres to obtain a cut plane, and the hardness at the central point of the cut plane and the hardness at the predetermined distances from the central point in the radius direction were measured. It is noted that the central point of the core was adopted as 0%, and the surface of the core was adopted as 100%. In addition, the hardness of the core was measured at four points at the predetermined distances from the central point of the cut plane, and the average value thereof was calculated. The hardness was measured with an automatic hardness tester (Digitest II, available from Bareiss company) using a testing device of "Shore C".

(3) Surface Hardness of Golf Ball and Surface Hardness of Intermediate Layer

The hardness measured at the land on the surface of the golf ball was adopted as the surface hardness of the ball. In addition, the hardness measured on the surface of the intermediate layer-covered sphere having the intermediate layer formed on the surface of the spherical core was adopted as the surface hardness of the intermediate layer. The hardness was measured with an automatic hardness tester (Digitest II, available from Bareiss company) using a testing device of "Shore C".

(4) Material Hardness (Shore D Hardness)

Sheets with a thickness of about 2 mm were produced by injection molding the intermediate layer composition or cover composition, and stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore 0".

(5) Driver Shot Test

A driver ("SRIXON ZX7", shaft hardness: S, loft angle: 10.5°, available from Sumitomo Rubber Industries, Ltd.) was installed on a swing machine available from Golf Laboratories, Inc. The hit point was set at the face center. The golf ball was hit at a head speed of 50 m/sec, and the ball velocity and spin rate right after hitting the golf ball, and the flight distance (the distance from the launch point to the landing point) were measured. The measurement was conducted twelve times for each golf ball, and the average value thereof was adopted as the measurement value for that golf ball. It is noted that the initial velocity, spin rate and flight distance of each golf ball in Tables 5 and 6 are shown as a difference from those of Golf ball No. 6.

(6) Middle Iron Test

An iron ("SRIXON ZX7", No. #7, loft angle: 32°, available from Sumitomo Rubber Industries, Ltd.) was installed on a swing machine available from Golf Laboratories, Inc. The hit point was set at the face center. The golf ball was hit at a head speed of 39 m/sec, and the spin rate right after hitting the golf ball was measured. The measurement was conducted twelve times for each golf ball, and the average value thereof was adopted as the measurement value for that golf ball. It is noted that the spin rate of each golf ball in Tables 5 and 6 is shown as a difference from that of Golf ball No. 6.

[Production of Golf Ball]

(1) Preparation of Rubber Composition

According to the formulations shown in Table 1, the rubber compositions were obtained by kneading the materials with a kneading roll.

TABLE 1

| Core composition | | A | B | C | D | E | F | G | H | I |
|---|---|---|---|---|---|---|---|---|---|---|
| Formulation (parts by mass) | (a) BR730 | 100 | 100 | 100 | 100 | 100 | 100 | 100 | 100 | 100 |
| | (b) ZN-DA90S | 30.8 | 24.0 | 34.5 | 31.4 | 30.4 | 29.4 | 23.2 | 28.1 | 35.5 |
| | (f) Zinc oxide | 10 | 5 | 5 | 10 | 10 | 5 | 10 | 5 | — |
| | Barium sulfate | *1) | *1) | *1) | *1) | *1) | *1) | *1) | *1) | *1) |
| | (g) Benzoic acid | 2 | — | — | 2 | 2 | — | 2 | — | — |
| | (d) 4-Methoxyphenol | 0.1 | — | — | 0.15 | — | — | — | — | — |
| | (e) PBDS | 0.4 | — | — | 0.4 | 0.4 | 0.4 | 0.4 | — | — |
| | (e) Diphenyldisulfide | — | 0.5 | 0.5 | — | — | — | — | — | 0.5 |
| | (c) Dicumyl peroxide | 0.9 | 0.7 | 0.8 | 0.9 | 0.8 | 0.7 | 0.8 | 0.8 | 0.8 |

*1) As to an amount of barium sulfate, adjustment was made such that the golf ball had a mass of 45.6 g.

The materials used in Table 1 are shown below.

BR730: high-cis polybutadiene rubber (amount of cis-1,4 bond=95 mass %, amount of 1,2-vinyl bond=1.3 mass %, Moony viscosity ($ML_{1+4}$(100° C.)=55, molecular weight distribution (Mw/Mn)=3) available from JSR Corporation ZN-DA90S: zinc acrylate (containing zinc stearate in an amount of 10%) available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

Benzoic acid: available from Emerald Kalama Chemical Corporation

4-Methoxyphenol: available from Tokyo Chemical Industry Co., Ltd.

PBDS: bis(pentabromophenyl) disulfide available from Kawaguchi Chemical Industry Co., Ltd.

DPDS: diphenyldisulfide available from Sumitomo Seika Chemicals Co., Ltd.

Dicumyl peroxide: available from Tokyo Chemical Industry Co., Ltd.

(2) Preparation of Intermediate Layer Composition

The intermediate layer composition in a pellet form was prepared by extruding the materials having the formulation shown in Table 2 with a twin-screw kneading extruder.

TABLE 2

| Intermediate layer composition | | a |
|---|---|---|
| Formulation | Surlyn 8150 | 50 |
| (parts by mass) | Himilan AM7329 | 50 |
| | Titanium dioxide | 4 |
| Hardness (Shore D) | | 68 |

Surlyn (registered trademark) 8150: a sodium ion neutralized ethylene-methacrylic acid copolymer ionomer resin available from Du Pont de Nemours, Inc.

Himilan (registered trademark) AM7329: a sodium ion neutralized ethylene-methacrylic acid copolymer ionomer resin available from Du Pont-Mitsui Polychemicals Co., Ltd.

Titanium dioxide: A-220 available from Ishihara Sangyo Kaisha, Ltd.

(3) Preparation of Cover Composition

The cover composition in a pellet form was prepared by extruding the materials having the formulation shown in Table 3 with a twin-screw kneading extruder.

TABLE 3

| Cover composition | | b |
|---|---|---|
| Formulation | Elastollan NY84A | 100 |
| (parts by mass) | Tinuvin 770 | 0.2 |
| | Titanium dioxide | 4 |
| Hardness (Shore D) | | 31 |

Elastollan (registered trademark) NY84A: thermoplastic polyurethane elastomer available from BASF Japan Ltd.

Tinuvin (registered trademark) 770: hindered amine-based light stabilizer available from BASF Japan Ltd.

Titanium dioxide: A-220 available from Ishihara Sangyo Kaisha, Ltd.

(4) Production of Core

Golf Balls No. 1 to No. 6 and No. 9

The spherical cores were obtained by heat-pressing the rubber compositions shown in Table 4 in upper and lower molds, each having a hemispherical cavity. It is noted that barium sulfate was added in an appropriate amount such that the obtained golf ball had a mass of 45.6 g.

Golf Balls No. 7, 8

The inner cores were obtained by heat-pressing the rubber compositions (inner layer formulation) shown in Table 4 in upper and lower molds, each having a hemispherical cavity. Next, half shells were molded from the rubber compositions (outer layer formulation) shown in Table 4. The inner core was covered with two of the half shells. The spherical cores were obtained by heat-pressing the inner core together with the half shells in upper and lower molds, each having a hemispherical cavity.

(5) Formation of Intermediate Layer and Cover

The intermediate layer-covered sphere was obtained by injection molding the intermediate layer composition onto the spherical core. The obtained intermediate layer-covered sphere was charged in a final mold having a plurality of pimples on the cavity surface. Half shells were obtained from the cover composition by the compression molding method. The intermediate layer-covered sphere charged in the final mold was covered with two of the half shells to produce the golf balls having a plurality of dimples with a reversed shape of the pimples on the cavity surface formed on the cover. The evaluation results of the obtained golf balls are shown in Tables 5 and 6.

TABLE 4

| | Golf ball No. | 1 | 2 | 3 | 4 | 5 | 6 | 7 | 8 | 9 |
|---|---|---|---|---|---|---|---|---|---|---|
| Spherical core | Core (inner layer) formulation | A | A | D | D | E | F | G | B | I |
| | Press temperature (° C.) | 155 | 160 | 150 | 160 | 150 | 150 | 170 | 170 | 170 |
| | Heating time (min) | 18 | 16 | 20 | 16 | 20 | 20 | 15 | 15 | 15 |
| | Outer layer formulation | — | — | — | — | — | — | C | H | — |
| | Thickness (mm) | — | — | — | — | — | — | 9.8 | 9.8 | — |
| | Press temperature (° C.) | — | — | — | — | — | — | 160 | 160 | — |
| | Heating time (min) | — | — | — | — | — | — | 16 | 16 | — |
| | Compression deformation amount (mm) | 3.18 | 3.29 | 3.20 | 3.31 | 3.18 | 3.21 | 3.21 | 3.31 | 3.18 |
| | Diameter (mm) | 38.5 | 38.5 | 38.5 | 38.5 | 38.5 | 38.5 | 38.5 | 38.5 | 38.5 |
| Intermediate layer | Formulation | a | a | a | a | a | a | a | a | a |
| | Thickness (mm) | 1.6 | 1.6 | 1.6 | 1.6 | 1.6 | 1.6 | 1.6 | 1.6 | 1.6 |
| | Surface hardness (Shore C) | 97 | 97 | 97 | 97 | 97 | 97 | 97 | 97 | 97 |
| | Material hardness (Shore D) | 68 | 68 | 68 | 68 | 68 | 68 | 68 | 68 | 68 |
| Cover | Formulation | b | b | b | b | b | b | b | b | b |
| | Thickness (mm) | 0.5 | 0.5 | 0.5 | 0.5 | 0.5 | 0.5 | 0.5 | 0.5 | 0.5 |
| | Material hardness (Shore D) | 31 | 31 | 31 | 31 | 31 | 31 | 31 | 31 | 31 |

TABLE 4-continued

| Golf ball No. | 1 | 2 | 3 | 4 | 5 | 6 | 7 | 8 | 9 |
|---|---|---|---|---|---|---|---|---|---|
| Ratio {(thickness of intermediate layer × material hardness of intermediate layer)/(thickness of cover × material hardness of cover)} | 7.0 | 7.0 | 7.0 | 7.0 | 7.0 | 7.0 | 7.0 | 7.0 | 7.0 |
| Golf ball Surface hardness (Shore C) | 63 | 63 | 63 | 63 | 63 | 63 | 63 | 63 | 63 |
| Compression deformation amount (mm) | 2.48 | 2.57 | 2.49 | 2.58 | 2.48 | 2.50 | 2.50 | 2.58 | 2.48 |

TABLE 5

| | Golf ball No. | 1 | 2 | 3 | 4 | 5 | 6 | 7 | 8 | 9 |
|---|---|---|---|---|---|---|---|---|---|---|
| Core hardness (Shore C) | Center hardness C0 | 60.2 | 61.8 | 60.1 | 60.6 | 58.2 | 65.5 | 59.2 | 60.8 | 68.7 |
| | Hardness C1 at 12.5% point | 64.4 | 65.7 | 63.2 | 65.8 | 60.6 | 67.4 | 61.1 | 62.3 | 73.6 |
| | Hardness C2 at 25.0% point | 67.1 | 68.8 | 66.2 | 67.9 | 66.8 | 70.2 | 65.2 | 63.7 | 73.8 |
| | Hardness C3 at 37.5% point | 69.6 | 69.3 | 68.1 | 68.8 | 67.6 | 71.4 | 70.6 | 66.1 | 75.2 |
| | Hardness C4 at 50.0% point | 72.2 | 70.1 | 71.1 | 70.5 | 69.2 | 73.2 | 74.8 | 70.0 | 76.1 |
| | Hardness C5 at 62.5% point | 78.0 | 76.1 | 79.6 | 78.2 | 74.8 | 75.8 | 78.8 | 74.3 | 76.4 |
| | Hardness C6 at 75.0% point | 80.7 | 78.8 | 80.2 | 79.6 | 79.4 | 78.8 | 80.2 | 78.8 | 78.8 |
| | Hardness C7 at 87.5% point | 81.3 | 81.6 | 80.9 | 82.1 | 81.2 | 80.2 | 80.7 | 81.1 | 83.2 |
| | Surface hardness C8 | 82.2 | 83.1 | 81.1 | 83.7 | 83.3 | 81.6 | 81.4 | 83.6 | 85.8 |
| | Hardness difference (C1 − C0) | 4.2 | 3.9 | 3.1 | 5.2 | 2.4 | 1.9 | 1.9 | 1.5 | 4.9 |
| | Hardness difference (C2 − C1) | 2.7 | 3.1 | 3.0 | 2.1 | 6.2 | 2.8 | 4.1 | 1.4 | 0.2 |
| | Hardness difference (C3 − C2) | 2.5 | 0.5 | 1.9 | 0.9 | 0.8 | 1.2 | 5.4 | 2.4 | 1.4 |
| | Hardness difference (C4 − C3) | 2.6 | 0.8 | 3.0 | 1.7 | 1.6 | 1.8 | 4.2 | 3.9 | 0.9 |
| | Hardness difference (C5 − C4) | 5.8 | 6.0 | 8.5 | 7.7 | 5.6 | 2.6 | 4.0 | 4.3 | 0.3 |
| | Hardness difference (C6 − C5) | 2.7 | 2.7 | 0.6 | 1.4 | 4.6 | 3.0 | 1.4 | 4.5 | 2.4 |
| | Hardness difference (C7 − C6) | 0.6 | 2.8 | 0.7 | 2.5 | 1.8 | 1.4 | 0.5 | 2.3 | 4.4 |
| | Hardness difference (C8 − C7) | 0.9 | 1.5 | 0.2 | 1.6 | 2.1 | 1.4 | 0.7 | 2.5 | 2.6 |
| | Hardness difference (C4 − C0) | 12.0 | 8.3 | 11.0 | 9.9 | 11.0 | 7.7 | 15.6 | 9.2 | 7.4 |
| | Hardness difference (C8 − C5) | 4.2 | 7.0 | 1.5 | 5.5 | 8.5 | 5.8 | 2.6 | 9.3 | 9.4 |
| | Hardness difference (C8 − C0) | 22.0 | 21.3 | 21.0 | 23.1 | 25.1 | 16.1 | 22.2 | 22.8 | 17.1 |

TABLE 6

| | Golf ball No. | 1 | 2 | 3 | 4 | 5 | 6 | 7 | 8 | 9 |
|---|---|---|---|---|---|---|---|---|---|---|
| Core hardness (Shore C) | Difference {(C5 − C4) − (C4 − C3)} | 3.2 | 5.2 | 5.5 | 6.0 | 4.0 | 0.8 | −0.2 | 0.4 | −0.6 |
| | Difference {(C5 − C4) − (C6 − C5)} | 3.1 | 3.3 | 7.9 | 6.3 | 1.0 | −0.4 | 2.6 | −0.2 | −2.1 |
| | Ratio {(C2 − C0)/(C5 − C4)} | 1.2 | 1.2 | 0.7 | 0.9 | 1.5 | 1.8 | 1.5 | 0.7 | 17.0 |
| | Ratio {(C2 − C0)/(C4 − C2)} | 1.4 | 5.4 | 1.2 | 2.8 | 3.6 | 1.6 | 0.6 | 0.5 | 2.2 |
| | Ratio {(C8 − C4)/(C2 − C0)} | 1.4 | 1.9 | 1.6 | 1.8 | 1.6 | 1.8 | 1.1 | 4.7 | 1.9 |
| | Value {(C2 − C0)/2} | 3.5 | 3.5 | 3.1 | 3.7 | 4.3 | 2.4 | 3.0 | 1.5 | 2.6 |
| | Value {(C7 − C5)/2} | 1.7 | 2.8 | 0.7 | 2.0 | 3.2 | 2.2 | 1.0 | 3.4 | 3.4 |
| | Value {(C8 − C6)/2} | 0.8 | 2.2 | 0.4 | 2.1 | 2.0 | 1.4 | 0.6 | 2.4 | 3.5 |
| | Difference [{(C2 − C0)/2} − {(C8 − C6)/2}] | 2.7 | 1.4 | 2.6 | 1.6 | 2.4 | 1.0 | 2.4 | −0.9 | −1.0 |
| | Difference [{(C2 − C0)/2} − {(C7 − C5)/2}] | 1.8 | 0.8 | 2.4 | 1.7 | 1.1 | 0.1 | 2.1 | −2.0 | −0.9 |
| | Difference [(C5 − C4) − {(C2 − C0)/2}] | 2.4 | 2.5 | 5.5 | 4.1 | 1.3 | 0.2 | 1.0 | 2.8 | −2.3 |
| | Cbmax | 5.8 | 6.0 | 8.5 | 7.7 | 6.2 | 3.0 | 5.4 | 4.5 | 4.9 |
| | Cbmin | 0.6 | 0.5 | 0.2 | 0.9 | 0.8 | 1.2 | 0.5 | 1.4 | 0.2 |
| | Ratio (Cbmax/Cbmin) | 9.7 | 12.0 | 42.5 | 8.6 | 7.8 | 2.5 | 10.8 | 3.2 | 24.5 |
| Ball evaluation | Driver shot Initial velocity (m/s) | 0.17 | 0.14 | 0.09 | 0.06 | −0.15 | 0 | −0.12 | −0.06 | −0.11 |
| | Spin rate (rpm) | 40 | 30 | 20 | 10 | −90 | 0 | 10 | −20 | 90 |
| | Flight distance (m) | 0.54 | 0.47 | 0.30 | 0.23 | 0.08 | 0.00 | −0.76 | −0.13 | −1.51 |
| | Iron shot Spin rate (rpm) | 140 | 110 | 100 | 80 | −220 | 0 | 40 | −80 | 70 |

The golf balls No. 1 to 4 are the cases that the spherical core has a hardness distribution in which the hardness difference (C1–C0), hardness difference (C2–C1), hardness difference (C3–C2) and hardness difference (C4–C3) are more than 0 and 6.0 or less, the hardness difference (C5–C4) is 5.0 or more, and the hardness difference (C6–C5), hardness difference (C7–C6) and hardness difference (C8–C7) are more than 0 and 3.5 or less. The golf ball No. 6 is the case that the spherical core has an outer-hard and inner-soft hardness distribution, and a nearly linear hardness gradient from the center toward the surface (the hardness difference (C5–C4) is less than 5). The golf balls No. 1 to 4 has more improved flight distance on driver shots and more improved spin rate on middle iron shots than the golf ball No. 6.

The preferable embodiment (1) according to the present disclosure is a golf ball comprising a spherical core and a cover covering the spherical core, wherein when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at 50.0% point from the center, a hardness (C5) at 62.5% point from the center, a hardness (C6) at 75.0% point from the center, a hardness (C7) at 87.5% point from the center and a surface hardness (C8) of the spherical core in Shore C hardness satisfy the following relationship:

$$0<(C1-C0)\leq 6.0,$$

$$0<(C2-C1)\leq 6.0,$$

$$0<(C3-C2)\leq 6.0,$$

$$0<(C4-C3)\leq 6.0,$$

$$5\leq(C5-C4),$$

$$0<(C6-C5)\leq 3.5,$$

$$0<(C7-C6)\leq 3.5, \text{ and}$$

$$0<(C8-C7)\leq 3.5,$$

The preferable embodiment (2) according to the present disclosure is the golf ball according to the preferable embodiment (1), wherein the hardness (C3), (C4) and (C5) of the spherical core in Shore C hardness satisfy the following relationship:

$$1.0\leq\{(C5-C4)-(C4-C3)\}.$$

The preferable embodiment (3) according to the present disclosure is the golf ball according to the preferable embodiment (2), wherein the hardness (C4), (C5) and (C6) of the spherical core in Shore C hardness satisfy the following relationship:

$$1.0\leq\{(C5-C4)-(C6-C5)\}.$$

The preferable embodiment (4) according to the present disclosure is the golf ball according to the preferable embodiment (2) or (3), wherein the hardness (C0), (C4), (C5) and (C8) of the spherical core in Shore C hardness satisfy the following relationship:

$$(C4-C0)>(C5-C4)>(C8-C5).$$

The preferable embodiment (5) according to the present disclosure is the golf ball according to the preferable embodiment (1), wherein the hardness (C0) and (C2) of the spherical core in Shore C hardness satisfy the following relationship:

The preferable embodiment (6) according to the present disclosure is the golf ball according to the preferable embodiment (5), wherein the hardness (C0), (C2), (C4) and (C5) of the spherical core in Shore C hardness satisfy the following relationship:

$$5.5\leq\{(C2-C0)/(C5-C4)\}.$$

The preferable embodiment (7) according to the present disclosure is the golf ball according to the preferable embodiment (5) or (6), wherein the hardness (C0), (C2) and (C4) of the spherical core in Shore C hardness satisfy the following relationship:

$$0.5\leq\{(C2-C0)/(C4-C2)\}.$$

The preferable embodiment (8) according to the present disclosure is the golf ball according to the present disclosure (1), wherein the hardness (C0), (C2), (C6) and (C8) of the spherical core in Shore C hardness satisfy the following relationship:

$$0\leq[\{(C2-C0)/2\}-\{(C8-C6)/2\}].$$

The preferable embodiment (9) according to the present disclosure is the golf ball according to the preferable embodiment (8), wherein the hardness (C0), (C2), (C5) and (C7) of the spherical core in Shore C hardness satisfy the following relationship:

$$0\leq[\{(C2-C0)/2\}-\{(C7-C5)/2\}].$$

The preferable embodiment (10) according to the present disclosure is the golf ball according to the preferable embodiment (8) or (9), wherein the hardness (C0), (C2), (C4) and (C5) of the spherical core in Shore C hardness satisfy the following relationship:

$$0\leq[\{(C5-C4)/2\}-\{(C2-C0)/2\}].$$

The preferable embodiment (11) according to the present disclosure is the golf ball according to any one of the preferable embodiments (1) to (10), wherein a ratio (Cbmax/Cbmin) is 4.0 or more where Cbmax is a maximum value and Cbmin is a minimum value among the hardness difference (C1–C0) between the hardness (C1) and the hardness (C0), the hardness difference (C2–C1) between the hardness (C2) and the hardness (C1), the hardness difference (C3–C2) between the hardness (C3) and the hardness (C2), the hardness difference (C4–C3) between the hardness (C4) and the hardness (C3), the hardness difference (C5–C4) between the hardness (C5) and the hardness (C4), the hardness difference (C6–C5) between the hardness (C6) and the hardness (C5), the hardness difference (C7–C6) between the hardness (C7) and the hardness (C6), and the hardness difference (C8–C7) between the hardness (C8) and the hardness (C7) of the spherical core in Shore C hardness.

The preferable embodiment (12) according to the present disclosure is the golf ball according to any one of the preferable embodiments (1) to (11), wherein the hardness (C0) and (C8) of the spherical core in Shore C hardness satisfy the following relationship:

$$18.0\leq(C8-C0).$$

The preferable embodiment (13) according to the present disclosure is the golf ball according to any one of the preferable embodiments (1) to (12), wherein the golf ball comprises an intermediate layer between the spherical core and the cover, and the surface hardness (C8) of the spherical core, a surface hardness of the intermediate layer and a surface hardness of the golf ball in Shore C hardness satisfy the following relationship:

surface hardness of core<surface hardness of intermediate layer>surface hardness of golf ball.

The preferable embodiment (14) according to the present disclosure is the golf ball according to any one of the preferable embodiments (1) to (13), wherein the golf ball comprises an intermediate layer between the spherical core and the cover, and a thickness (mm) and a material hardness (Shore D) of the intermediate layer and a thickness (mm) and a material hardness (Shore D) of the cover satisfy the following relationship:

{(thickness of intermediate layer×material hardness of intermediate layer)/(thickness of cover×material hardness of cover)}≥4.0.

The preferable embodiment (15) according to the present disclosure is the golf ball according to any one of the preferable embodiments (1) to (14), wherein the golf ball has a compression deformation amount of 2.8 mm or less measured by applying a load from 98 N as an initial load to 1275 N as a final load to the golf ball.

The preferable embodiment (16) according to the present disclosure is the golf ball according to any one of the preferable embodiments (1) to (15), wherein the spherical core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

The preferable embodiment (17) according to the present disclosure is the golf ball according to the preferable embodiment (16), wherein the core rubber composition contains (d) the monophenol compound having the substituent group only at the p-position in an amount ranging from 0.05 part by mass to 2.0 parts by mass with respect to 100 parts by mass of (a) the base rubber.

The preferable embodiment (18) according to the present disclosure is the golf ball according to the preferable embodiment (16) or (17), wherein (d) the monophenol compound having the substituent group only at the p-position is a compound represented by the general formula (1).

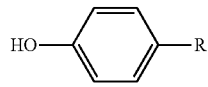
(1)

[In the general formula (1), R represents an alkoxy group, a halogen group, a hydrocarbon group, a nitro group, a cyano group, an amino group, or a hydroxy group.]

The preferable embodiment (19) according to the present disclosure is the golf ball according to any one of the preferable embodiments (16) to (18), wherein the core rubber composition further contains (g) an aromatic carboxylic acid and/or a salt thereof.

The preferable embodiment (20) according to the present disclosure is the golf ball according to any one of the preferable embodiments (16) to (19), wherein the spherical core is single layered.

This application is based on Japanese patent applications No. 2022-086868, 2022-086869 and 2022-086870 filed on May 27, 2022, the contents of which are hereby incorporated by reference.

The invention claimed is:

1. A golf ball comprising a spherical core and a cover covering the spherical core, wherein
when a straight line starting from a center of the spherical core and ending at a surface of the spherical core is divided into equal eight parts, a center hardness (C0), a hardness (C1) at 12.5% point from the center, a hardness (C2) at 25.0% point from the center, a hardness (C3) at 37.5% point from the center, a hardness (C4) at 50.0% point from the center, a hardness (C5) at 62.5% point from the center, a hardness (C6) at 75.0% point from the center, a hardness (C7) at 87.5% point from the center and a surface hardness (C8) of the spherical core in Shore C hardness satisfy the following relationship:

$0<(C1-C0)\leq 6.0$, $0<(C2-C1)\leq 6.0$, $0<(C3-C2)\leq 6.0$, $0<(C4-C3)\leq 6.0$, $5.0\leq(C5-C4)$, $0<(C6-C5)\leq 3.5$, $0<(C7-C6)\leq 3.5$, $0<(C8-C7)\leq 2.5$, and $(C4-C0)>(C5-C4)>(C8-C5)$.

2. The golf ball according to claim 1, wherein the hardness (C3), (C4) and (C5) of the spherical core in Shore C hardness satisfy the following relationship:

$1.0\leq\{(C5-C4)-(C4-C3)\}$.

3. The golf ball according to claim 1, wherein the hardness (C4), (C5) and (C6) of the spherical core in Shore C hardness satisfy the following relationship:

$1.0\leq\{(C5-C4)-(C6-C5)\}$.

4. The golf ball according to claim 1, wherein the hardness (C0) and (C2) of the spherical core in Shore C hardness satisfy the following relationship:

$5.5\leq(C2-C0)$.

5. The golf ball according to claim 1, wherein the hardness (C0), (C2), (C4) and (C5) of the spherical core in Shore C hardness satisfy the following relationship:

$0.5\leq\{(C2-C0)/(C5-C4)\}$.

6. The golf ball according to claim 1, wherein the hardness (C0), (C2) and (C4) of the spherical core in Shore C hardness satisfy the following relationship:

$1.0\leq\{(C2-C0)/(C4-C2)\}$.

7. The golf ball according to claim 1, wherein the hardness (C0), (C2), (C6) and (C8) of the spherical core in Shore C hardness satisfy the following relationship:

$0\leq[\{(C2-C0)/2\}-\{(C8-C6)/2\}]$.

8. The golf ball according to claim 1, wherein the hardness (C0), (C2), (C5) and (C7) of the spherical core in Shore C hardness satisfy the following relationship:

$0\leq[\{(C2-C0)/2\}-\{(C7-C5)/2\}]$.

9. The golf ball according to claim 1, wherein the hardness (C0), (C2), (C4) and (C5) of the spherical core in Shore C hardness satisfy the following relationship:

$0\leq[(C5-C4)-\{(C2-C0)/2\}]$.

10. The golf ball according to claim 1, wherein a ratio (Cbmax/Cbmin) is 4.0 or more where Cbmax is a maximum value and Cbmin is a minimum value among the hardness difference (C1−C0) between the hardness (C1) and the hardness (C0), the hardness difference (C2−C1) between the hardness (C2) and the hardness (C1), the hardness difference (C3−C2) between the hardness (C3) and the hardness (C2), the hardness difference (C4−C3) between the hardness (C4) and the hardness (C3), the hardness difference (C5−C4) between the hardness (C5) and the hardness (C4), the hardness difference (C6−C5) between the hardness (C6) and the hardness (C5), the hardness difference between (C7−C6) the hardness (C7) and the hardness (C6), and the hardness difference (C8−C7) between the hardness (C8) and the hardness (C7) of the spherical core in Shore C hardness.

11. The golf ball according to claim 1, wherein the hardness (C0) and (C8) of the spherical core in Shore C hardness satisfy the following relationship:

$18.0\leq(C8-C0)$.

12. The golf ball according to claim 1, wherein the golf ball comprises an intermediate layer between the spherical core and the cover, and the surface hardness (C8) of the spherical core, a surface hardness of the intermediate layer and a surface hardness of the golf ball in Shore C hardness satisfy the following relationship:

surface hardness of core<surface hardness of intermediate layer>surface hardness of golf ball.

13. The golf ball according to claim 1, wherein the golf ball comprises an intermediate layer between the spherical core and the cover, and a thickness (mm) and a material hardness (Shore D) of the intermediate layer and a thickness (mm) and a material hardness (Shore D) of the cover satisfy the following relationship:

{(thickness of intermediate layer×material hardness of intermediate layer)/(thickness of cover×material hardness of cover)}≥4.0.

14. The golf ball according to claim 1, wherein the golf ball has a compression deformation amount of 2.8 mm or less measured by applying a load from 98 N as an initial load to 1275 N as a final load to the golf ball.

15. The golf ball according to claim 1, wherein the spherical core is formed from a core rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a monophenol compound having a substituent group only at p-position.

16. The golf ball according to claim 15, wherein the core rubber composition contains (d) the monophenol compound having the substituent group only at the p-position in an amount ranging from 0.05 part by mass to 2.0 parts by mass with respect to 100 parts by mass of (a) the base rubber.

17. The golf ball according to claim 15, wherein (d) the monophenol compound having the substituent group only at the p-position is a compound represented by the general formula (1):

in the general formula (1), R represents an alkoxy group, a halogen group, an alkyl group, an alkenyl group, an alkynyl group, aryl group, a nitro group, a cyano group, an amino group, or a hydroxy group.

18. The golf ball according to claim 15, wherein the core rubber composition further contains (g) an aromatic carboxylic acid and/or a salt thereof.

19. The golf ball according to claim 1, wherein the spherical core is single layered.

20. The golf ball according to claim 1, wherein the golf ball has a compression deformation amount of 2.0 mm or more and 2.58 mm or less measured by applying a load from 98 N as an initial load to 1275 N as a final load to the golf ball.

* * * * *